United States Patent [19]

Clement

[11] Patent Number: 5,195,123
[45] Date of Patent: Mar. 16, 1993

[54] RADIOGRAPH IDENTIFICATION METHOD AND DEVICE

[76] Inventor: Richard J. Clement, 7817 Tuckerman La., Potomac, Md. 20854

[21] Appl. No.: 551,661

[22] Filed: Jul. 12, 1990

Related U.S. Application Data

[63] Continuation-in-part of Ser. No. 275,163, Nov. 23, 1988, abandoned.

[51] Int. Cl.⁵ .............................................. H05G 1/28
[52] U.S. Cl. .................................... 378/166; 378/165; 378/162; 206/455; 206/459.1; 206/232; 40/638; 40/371
[58] Field of Search ................ 378/165, 166; 206/455, 206/459, 232; 40/638, 371

[56] References Cited

U.S. PATENT DOCUMENTS

| | | | |
|---|---|---|---|
| 3,846,634 | 11/1974 | Fleming | 378/166 |
| 3,962,807 | 6/1976 | Pantone | 40/371 |
| 3,980,401 | 9/1976 | Holliday | 40/638 |
| 4,035,653 | 7/1977 | Karasko | 378/165 |
| 4,584,219 | 4/1986 | Baartmans | 40/638 |
| 4,631,845 | 12/1986 | Samuel et al. | 40/638 |
| 4,662,652 | 5/1987 | Hargis | 40/371 |
| 4,679,222 | 7/1987 | Knopp | 378/166 |
| 4,928,298 | 5/1990 | Tanaka | 378/165 |

Primary Examiner—Janice A. Howell
Assistant Examiner—Kim-Kwok Chu
Attorney, Agent, or Firm—Mason, Fenwick & Lawrence

[57] ABSTRACT

A radiograph identification and filing apparatus and method for photographically imprinting information onto radiographic film and filing the radiographic film. The apparatus comprises an adhesive-backed label and a jacket for storing the film. When used with a darkroom radiograph imprinter, the label, the adhesive backing for the label, and the release liner are all photo-transparent. When used with a radiograph ID camera, the label is photo-opaque. The label is divided into a plurality of information fields which include print information material. In a label for use with an imprinter, the print information is photo-opaque. The jacket includes a pocket for receiving the film and exterior surfaces for receiving the label. For an imprinter, the method includes providing a label having an imprint field having substantially the same dimensions as the light window of the imprinter. For an ID camera, the method includes providing a label having an imprint field having substantially the same dimensions as the shield of the cassette for holding the film. Both methods further comprise providing a jacket for storing the film; exposing the film to X-rays while shielding the information portion of the film from the X-rays; marking the film with the label using the imprinter or the ID camera; removing the label from the imprinter; and adhering the label to at least one of the exterior surfaces of the jacket.

22 Claims, 27 Drawing Sheets

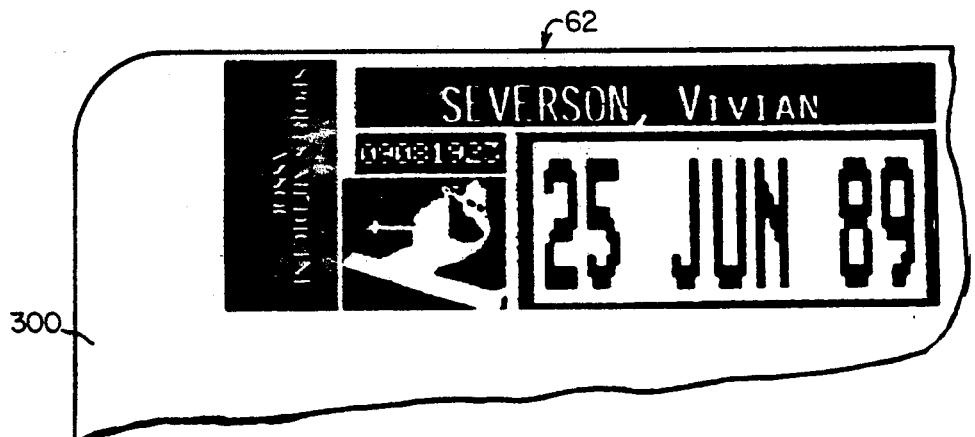
FIG. 1g
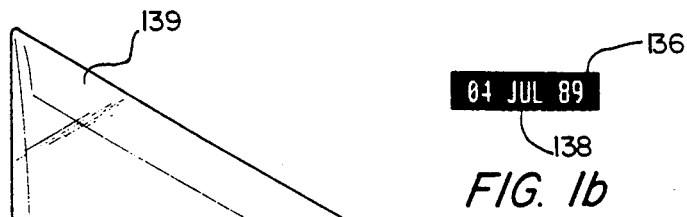
FIG. 1c
FIG. 1b
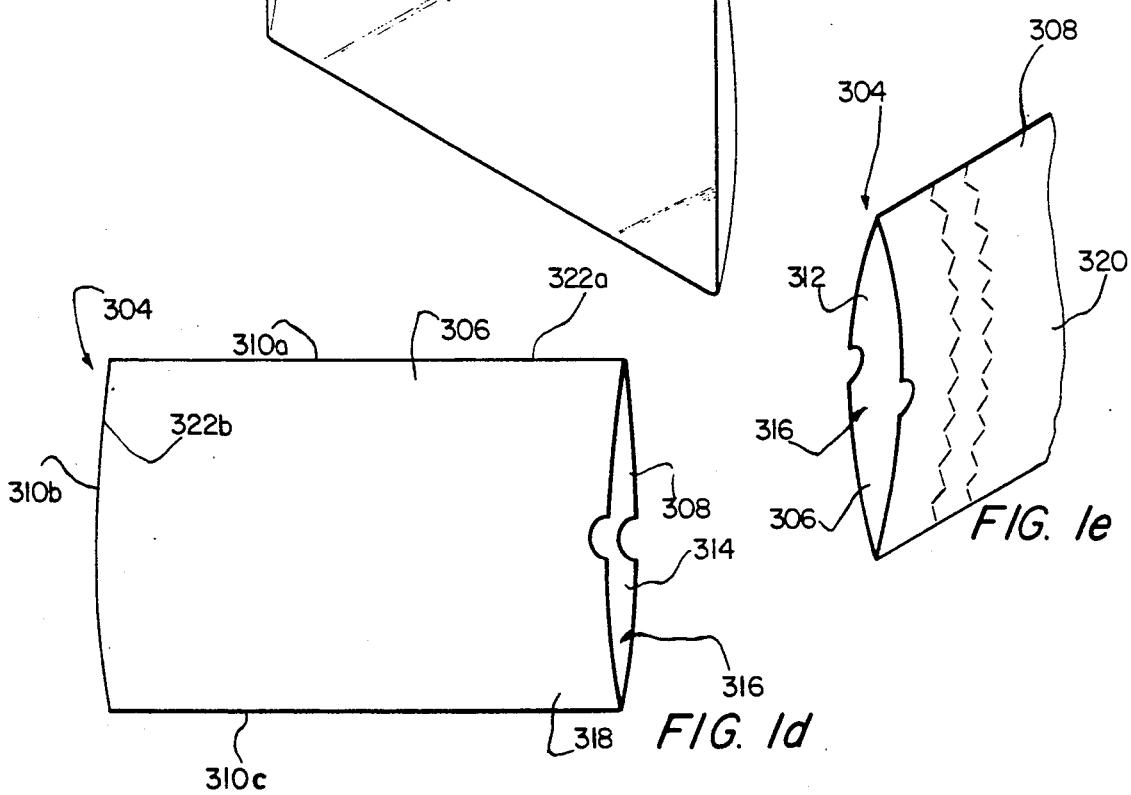
FIG. 1e
FIG. 1d

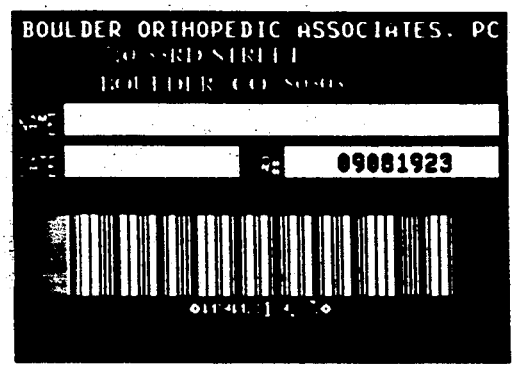
FIG. 7e
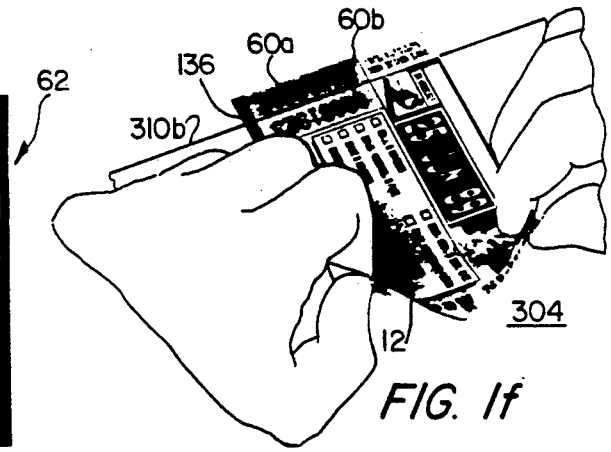
FIG. 1f
FIG. 7f
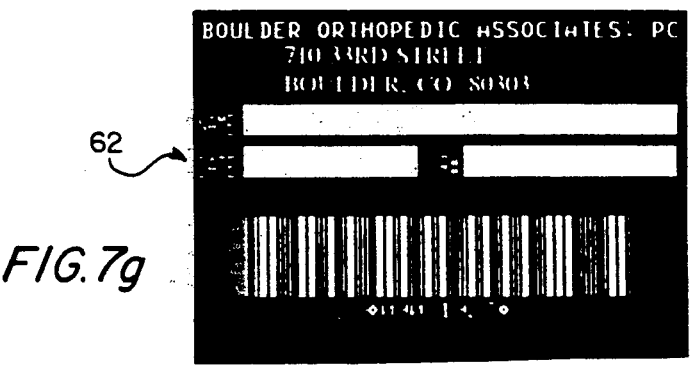
FIG. 7g

RADIOGRAPH IDENTIFICATION METHOD AND DEVICE

CROSS-RELATED APPLICATION

The present application is a continuation-in-part application of U.S. Patent Application Ser. No. 275,163, filed on Nov. 23, 1988 abandoned.

BACKGROUND OF THE INVENTION

The present invention is directed to the field of radiograph identification, and is more specifically directed to a device and method for permanently recording certain information on both a radiograph and the jacket used for storing and mailing the radiograph.

Devices for recording information on radiographs have been made in a number of forms which operate in different ways. The simplest device comprises a standard sized index card, often referred to as a "flash" card, on which the desired information is recorded in a standard sized box about 2.6 cm high by 7.6 cm wide. The box is generally located adjacent the upper edge of the index card, its precise position relative to the left and right edges depending on the brand of imprinter. Such a flash card is described in U.S. Pat. No. 4,662,652 (Hargis).

A portion of the radiographic film corresponding in size to the box on the flash card is blocked while the radiograph is being taken so that an area of the film is not exposed. The flash card is utilized by placing onto a conventional darkroom imprinter or "flash box" that has a window also corresponding in size to the box on the flash card. There are two basic types of commercially available, conventional imprinters, those having a light window positioned to align with the top left portion of the flash card, characterized by the Kodak TM X-Omatic TM models X-1 and X-1-L identification cameras, and those having a light window positioned to align with the top center portion of the flash card, characterized by the S&S X-Ray Products, Inc. catalogue numbers 144, 144X, 143 and 143X film identification printers. The radiographic film is then put on top of the flash box with the unexposed area aligned in vertical registration with the flash card. When the light in the flash box is turned on, light passes through the flash card, permanently imprinting the information to be recorded as white non-exposed print.

An improvement on the basic flash card is disclosed by Hargis. Hargis replaces the standard index card with a square card having information spaces printed on all four sides, allowing four different groups of radiographs to be imprinted for four different patients. However, Hargis makes no provision for transfer of the desired information to the storage jacket for the radiograph. Once the radiograph has been made, the desired information must be recorded separately on the filing jacket, increasing the risk of error in so doing.

Another improvement on the basic flash card is disclosed by U.S. Pat. No. 4,679,222 (Knopp). Knopp uses a patient history form having a special field thereon containing the patient identification information which is desired to be transferred to the radiographic film. However, Knopp also modifies the standard imprinter in order to allow the necessary registration between the form and the window of the imprinter. Also, the desired information still must be recorded separately on the filing jacket.

U.S. Pat. No. 3,849,648 [Allan et al (Allan)] discloses a flash card for use in an electron radiography system which is insensitive to light. In the Allan system, the conventional imprinter is replaced by a xerographic-type imaging chamber. There is no provision for recording information on a filing jacket.

A system for providing identical coded information on both a radiograph and its storage envelope is disclosed in U.S. Pat. No. 3,962,807 (Pantone). Pantone codes individual radiographs according to the number of each visit within a series of patient visits and also according to the body part or system examined. Pantone uses a color or symbol coded label on both the radiographic film and its storage envelope to indicate the visit number and a color or symbol coded label on the radiographic film only to indicate the body part or system examined. The label on the storage envelope is associated with a space on the envelope for recording additional information such as patient name and date and the doctor's findings. There is no provision for recording this additional information on the radiographic film.

The above-described systems also suffer from an additional flaw. In order to identify or locate a particular radiograph, all radiographs or their storage jackets must be examined individually. Where a large system of files must be maintained, yet be readily available, as in a medical facility, individual examination of files is extremely time-consuming and inefficient, and can be inaccurate. A labeling system which attempts to eliminate this problem is disclosed in U.S. Pat. No. 4,204,639 [Barber et al (Barber)]. Barber uses a series of labels on each article to be filed. Each label has a color-coded field with a pair of identical spaced numbers thereon and bears to one side of this field a machine-readable marking such as an OCR or a bar code which corresponds to the numbers. When a label is applied to an article and folded at a fold line provided between the numbers, one of the numbers is visible on both sides of the article and the machine-readable marking is visible on one side of the article. A series of labels is applied to each article to build up a code number. Although Barber's labels solve the problem of individual visual inspection, they do not eliminate the need for separately recording other identification information on the radiographic film and its storage jacket.

In summary, no simple system or method exists both for imprinting information onto radiographic film and labeling the storage jacket, and which also provides machine-readable means for identifying or locating an individual radiograph. It is the solution of these and other problems to which the present invention is directed.

SUMMARY OF THE INVENTION

It is, therefore, a primary object of this invention to provide a system and method both for imprinting information onto radiographic film and labeling the storage jacket for the radiographic film.

It is another object of the invention to provide a system and method for imprinting information onto radiographic film which employs a conventional or a custom darkroom imprinter or an ID camera.

It is still an object of the invention to provide a system and method for imprinting machine-readable identification information onto radiographic film.

It is yet an object of the invention to provide a system and method for imprinting radiographic film and labeling the storage jacket with machine-readable identification information.

The foregoing and other objects of the invention are achieved by provision of a radiograph identification and filing apparatus for photographically imprinting information onto radiographic film and filing the radiographic film, comprising an adhesive-backed label, a release liner to which the label is releasably adhered, and a jacket for storing the radiographic film. The label is made of a photo-transparent material, i.e. a material which transmits white light, and has a photo-transparent adhesive backing, while the release liner is also made of a photo-transparent material.

The label is divided into three information fields, a machine-readable field, an imprint field, and a background field, which include print information material which is photo-opaque, i.e. opaque to white light. The information material in the machine-readable field comprises a pair of spaced-apart parallel positive images of a bar code. The information material in the imprint field includes permanent information such as the name of the medical facility and blanks for the insertion of variable information such as patient name and date. It can also comprises a negative image of the bar code, the bar code representing a number for identifying the radiographic film. The information material in the background field comprises information about the radiograph. It is contemplated that all three fields may contain machine-readable subject matter.

In one aspect of the invention, at least a portion of the imprint field is formed with a photo-opaque background, the blanks for the variable information being formed as photo-transparent windows therein. The permanent information can be formed as negative images in the photo-opaque background.

The jacket comprises rectangular front and back panels joined at one edge thereof the panels having interior surfaces defining a pocket for receiving the radiographic film and exterior surfaces for receiving the label.

In one aspect of the invention, the release liner is in the form of a web, and a plurality of labels are adhered to the liner in parallel, spaced-apart relationship. In another aspect of the invention, the information material in the imprint field includes an image of the identification number of the radiographic film, consecutive labels being printed with images of consecutive identification numbers and bar codes representing the consecutive identification numbers.

One method according to the invention is achieved by providing a darkroom imprinter having a light window and a light source which when turned on, shines through the light window, providing a label made of a material which transmits white light and being divided into at least a machine-readable information field and an imprint information field, the imprint field being substantially the same dimensions as the light window of the imprinter, the information field including print information material which is opaque to white light; providing a jacket for storing the radiographic film, the jacket comprising rectangular front and back panels joined at one edge thereof, the panels having interior surfaces defining a pocket for receiving the radiographic film and exterior surfaces for receiving the label; exposing the radiographic film to X-rays while shielding an information portion of the radiographic film from the X-rays, the information portion corresponding in size to the imprint field; placing the radiographic film and the label unit on the imprinter, the label unit being interposed between the light window of the imprinter and the information portion of the radiographic film, the light window, and the imprint field of the label being registered in vertical alignment; exposing the information portion of the radiographic film using the imprinter; removing the label from the imprinter; and adhering the label to at least one of the exterior surfaces of the jacket with the machine-readable field adjacent the joined edge of the jacket.

Another method according to the invention is achieved by providing a radiograph ID camera having a lens; providing a cassette for holding the radiograph, the cassette having a shield for shielding an imprint area on the radiographic film; providing a photo-opaque label divided into at least a machine-readable information field and an imprint information field, the imprint field having substantially the same dimensions as the shield of the cassette, the information fields including print information material; providing jacket means for storing the radiographic film, the jacket means comprising rectangular front and back panels joined at one edge thereof, the panels having interior surfaces defining a pocket for receiving the radiographic film and exterior surfaces for receiving the label; placing the radiographic film in the cassette and exposing the radiographic film to X-rays; placing the cassette with the radiographic film therein in the ID camera; placing the label in front of the lens of the camera and photographing the label using the camera, to transfer the print information material on the label onto the radiographic film; removing the label from the imprinter; and adhering the label to at least one of the exterior surfaces of the jacket means.

A better understanding of the disclosed embodiments of the invention will be achieved when the accompanying detailed description is considered in conjunction with the appended drawings, in which like reference numerals are used for the same parts as illustrated in the different FIGS.

BRIEF DESCRIPTION OF THE DRAWINGS

FIG. 1b is a top plan view of a sub-label for use with the labeling unit of FIG. 1a.

FIG. 1c is a front perspective view of a transparent sleeve for use with the labeling unit of FIG. 1a.

FIG. 1d is a side perspective view of a radiograph storage jacket for use with the labeling unit of FIG. 1a.

FIG. 1e is a front perspective view of the jacket of FIG. 1d.

FIG. 1f is a perspective view of a portion of a radiograph storage jacket to which a user is applying a label incorporating the teaching of the present invention.

FIG. 1g is a plan view showing a portion of a radiographic film with an imprint field thereon.

FIGS. 7a through 7g are top plan views of labels according to the invention showing alternative forms for the print information material included in the imprint field for a custom imprinter.

DETAILED DESCRIPTION OF THE PREFERRED EMBODIMENTS

Figure 1A:
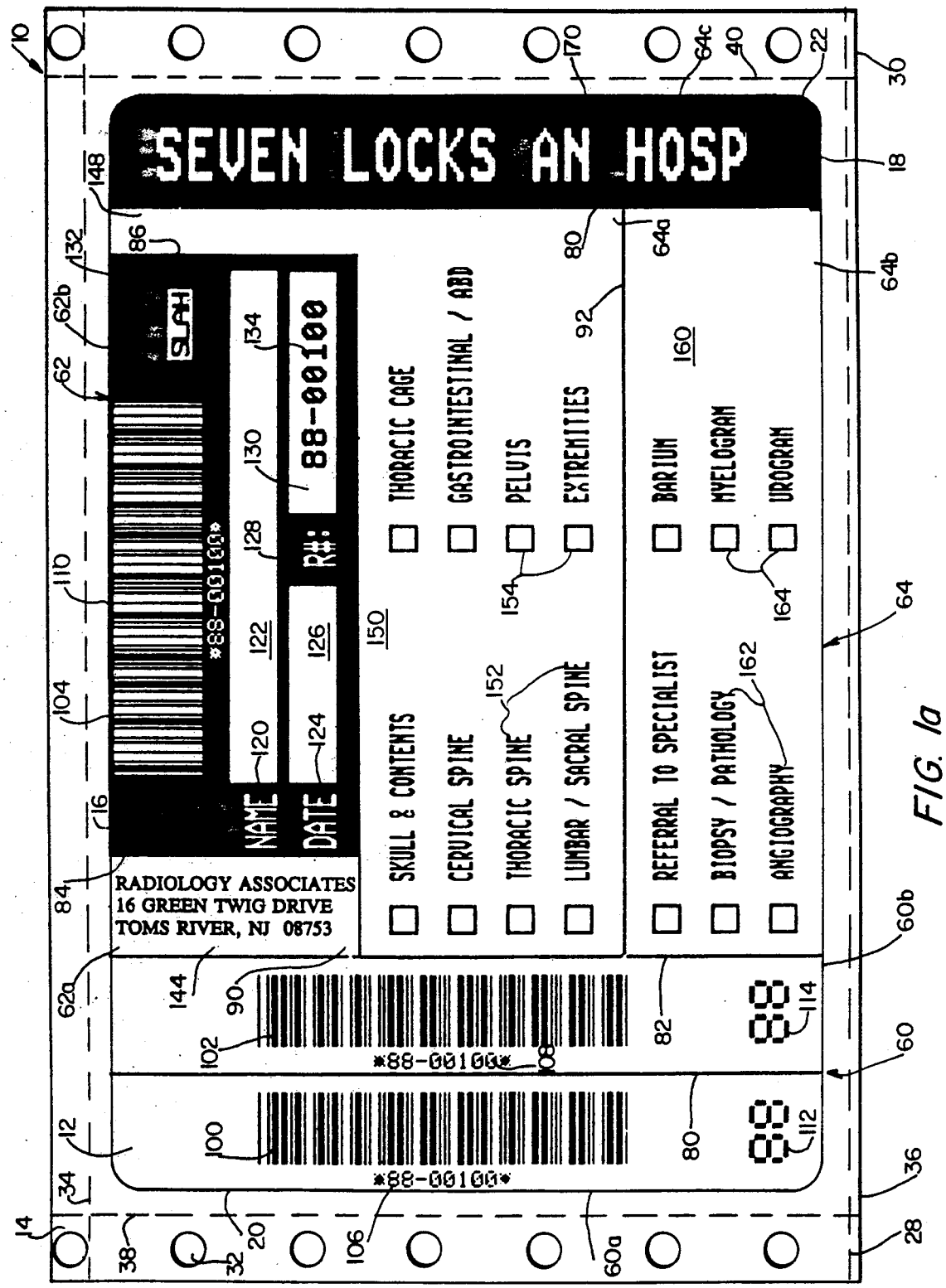
FIG. 1a is a top plan view of a first embodiment of a labeling unit according to the invention.

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to FIGS. 1a through 1c and 3, there is shown a first embodiment of a radiographic imprinting and labeling unit 10 according to the invention for photographically imprinting information onto radiographic film and labeling a radiograph storage jacket. Unit 10 comprises an adhesive label 12 and a release liner 14 to which adhesive label 12 is releasably adhered.

Label 12 is rectangular, having opposed top and bottom edges 16 and 18 and opposed left and right edges 20 and 22. As will be described in greater detail hereinafter, label 12 is intended to be inserted with radiographic film into an imprinter. In a preferred embodiment, label 12 is approximately 11.7 cm wide and 7.6 cm long, to enable it to fit under the clips of a conventional darkroom imprinter, as will be described in greater detail hereinafter.

Figure 4:
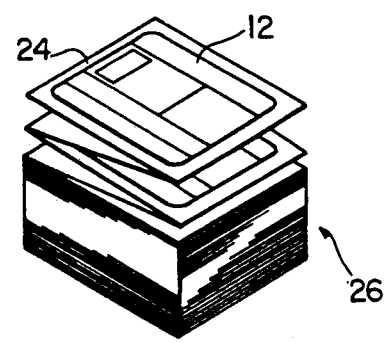
FIG. 4 is a perspective view of a fan-folded block of labeling units according to the invention.

Referring now to FIG. 4, in order to facilitate the printing of multiple labels 12, release liner 14 can be in the form of a web 24 and a plurality of labels 12 can be adhered in parallel, spaced-apart relation on the web 24 and folded to form a fan-folded block 26. In order to enable block 26 to be fed through a printer with conventional pinfeeders, the width of web 24 is greater than the width of labels 12, and the sides 28 and 30 of web 24 are provided with conventional pinfeed holes 32 for engagement by the pinfeeders.

In order to enable correct orientation of a label unit 10 in the imprinter after the unit's separation from block 26, release liner 14 must have substantially the same dimensions as label 12. To this end, web 24 is provided with top, bottom, left, and right perforation lines 34, 36, 38 and 40 abutting edges 16, 18, 20 and 22, respectively, of each label 12. The formation of block 26, including pin feed holes 32 and perforation lines 34, 36, 38 and 40 in web 24 can be achieved by any conventional means.

Alternatively, each label 12 can be adhered to an individual release liner (not shown) or several labels 12 can be adhered to an elongated sheet (not shown). Where label 12 is adhered to an individual release liner 14, release liner 14 can have substantially the same dimensions as label 12 to enable their correct orientation in the imprinter. Where several labels 12 are adhered to an elongated sheet, the sheet is provided with top, bottom, left and right perforation lines abutting edges 16, 18, 20 and 22, respectively, of each label 12 similar to those provided on web 24, to enable correct orientation of the label 12 and its release liner 14 after their separation from the sheet.

Label 12 is made of a maximally photo-transparent material and has a maximally photo-transparent adhesive backing 52. The photo-transparent material can be facestock, cardstock, a plastic such as a clear polyester film, or the like. The release liner 14 also is maximally photo-transparent. The facestock or cardstock can have, for example, a glossy white finish, a flat white finish or a transparent matte finish, and preferably accepts ink from a typewriter or printer. A suitable 0.007 inch polyester film is made by ICI of Wilmington, Del., and is coated on one side with a coating which will enable it to accept ink from a typewriter or printer. Such a coating is sold by FLEXCon Co., Inc. of Spencer, Mass. under the name "CompuCal II." This coating enables the use of thermal transfer carbon inks, typewriter ribbons, ballpoint pens, permanent ink pens, and pencil to write on label 12, and further permits pencil to be erased. The polyester film can be frosted on one surface of label 12 to provide better visibility when the label 12 is rolled into a typewriter platen.

The more photo-transparent the label 12, the sharper will be the resulting image on the radiograph. Because the polyester film is substantially more photo-transparent than any of the paper materials used, it provides a substantially sharper image. The frosting of one of the surfaces does not significantly impair its photo-transparency.

Not all radiographs are marked by darkroom imprinters using "flash" cards. Large volume medical facilities, such as hospitals, use expensive ID "cameras," for example the Kodak X-Omatic TM Identification Camera, which mark the radiographic film in daylight (i.e. non-darkroom conditions) using an ID card. ID cameras differ from imprinters in that they do not flash light through the ID, card being used to mark the radiographic film. Rather, the ID card is placed in front of the lens, the radiographic film in its cassette is placed in the camera, and the image on the ID card is transferred to the imprint area of the radiographic film by the ID camera in the same way as an image is transferred onto film by a conventional camera. ID cameras therefore require the use of cards made from an opaque, rather than a photo-transparent, material. Thus, a label unit 10 in accordance with the invention which is to be used with an ID camera has a label 12 made from an opaque material. I have found that high-grade Kimdura TM synthetic stock made by Kimberly Clark provides superior results to other materials.

Obviously, the adhesive backing and the release liner 14 for a label unit 0 for use with an ID camera need not be photo-transparent, but can instead be photo-opaque. The label unit 10 for use with an ID camera is otherwise similar in appearance and construction to a label unit 10 for use with an imprinter, as hereinafter described. Thus, areas which are photo-transparent in a label unit 10 for use with an imprinter are merely left blank in a label unit 10 for use with an ID camera and areas which are photo-opaque in a label unit 10 for use with an imprinter are black in a label unit 10 for use with an ID camera.

Both label 12 and release liner 14 should be sufficiently flexible to be fed together through a typewriter or printer platen. The adhesive backing 52 preferably is pressure-sensitive and should be permanent, enabling a shelf life of at least ten years, and also should be sufficiently flexible to allow the label 12 and the release liner 14 to be fed through a typewriter or printer platen.

Label 12 is divided into three information fields, machine-readable field 60, imprint field 62 and background field 64. Machine-readable field 60 is divided into two subfields 60a and 60b, imprint field 62 is divided into two subfields 62a and 62b and background field 64 is divided into three subfields 64a, 64b and 64c. All information subfields 60a, 60b, 62a, 62b, 64a, 64b and 64c are separated from each other by a plurality of dividing lines 80, 82, 84, 86, 88, 90 and 92 which are opaque to white light.

Information fields 60, 62 and 64 include print information material which is opaque to white light. The print information material can comprise a positive image against the white or transparent background of label 12 or it can comprise a printed background with a negative image formed therein by the white or transparent background of label 12.

Machine-readable field 60 is positioned on label 12 to abut one edge of label 12, for a purpose to be described hereinafter. Machine-readable subfield 60a is bounded on the left by left edge 20 of label 12, at the top by top edge 16 of label 12, at the bottom by bottom edge 18 of label 12 and on the right by dividing line 80. Machine-readable subfield 60b is bounded on the left by dividing line 80, at the top by top edge 16 of label 12, at the bottom by bottom edge 18 of label 12, and on the right by dividing line 82.

Imprint field 62 is positioned on label 12 to align with the light window of the majority of conventional imprinters. Imprint subfield 62a is positioned between machine-readable field 60b and imprint subfield 62b and is bounded on the left by the upper portion of dividing line 82, on the right by dividing line 84, at the top by top edge 16 of label 12, and at the bottom by the left portion of dividing line 90.

Imprint subfield 62b is bounded at the top by top edge 16 of label 12, on the left and right by dividing lines 84 and 86, respectively, and at the bottom by the right portion of dividing line 90. Imprint subfield 62a is the same length as imprint subfield 62b.

Background field 64 occupies the remaining space on label 12. Background subfield 64a is positioned below imprint subfields 62a and 62b and is bounded on the left by the middle portion of dividing line 82, on the right by the middle portion of dividing line 88, at the top by dividing line 90, and at the bottom by dividing line 92. Background subfield 64b is positioned below background subfield 64a and is bounded on the left by the lower portion of dividing line 88, on the right by the lower portion of dividing line 82, at the top by dividing line 94, and at the bottom by the bottom edge 18 of label 12. Background subfield 64c is positioned to the right of imprint subfield 62b and extends from top edge 16 to bottom edge 18 of label 12. It is bounded on the left by dividing line 88 and on the right by right edge 22 of label 12. As shown in FIG. 1a, background subfield 64c is separated from imprint subfield 62b by a blank area 148. Blank area 148 provides a visual separation between the printed backgrounds of imprint subfield 62b and background subfield 64c.

Dividing line 80 separating machine-readable subfields 60a and 60b from each other extends substantially all the way across label 12 from top edge 16 to bottom edge 18 and defines a fold line 136, for a purpose to be described hereinafter. Fold line 136 defines a front portion 140 of label 12 to the right side thereof, comprising machine-readable subfield 60b, imprint field 62, and background field 64, and a back portion 142 of label 12 to the left side thereof, comprising machine-readable subfield 60a. As shown in FIG. 1a, machine-readable subfield 60a is the only information subfield on back portion 142.

Machine-readable subfield 60a includes information material comprising a first positive image 100 of a bar code or other machine-readable marking representing an identification number for identifying the radiographic film. Some portion of the identification number, e.g. the first two digits, can represent the year.

Machine-readable subfield 60b includes information material comprising a second positive image 102 of the bar code or other machine-readable marking. Machine-readable subfields 60a and 60b can be color coded with an ink which transmits white light, for a purpose to be discussed hereinafter. The information material in machine-readable subfields 60a and 60b further comprises first and second images 106 and 108, respectively, of an interpretation line for the bar code. Enlarged first and second images 112 and 114 of the first two digits can also be included in machine-readable subfields 60a and 60b to provide an easily readable indication of the year.

As shown in FIG. 1a, the first and second images 106 and 108 of the interpretation line are positive like the first and second images 100 and 102, respectively, of the bar code. Images 106 and 108 of the interpretation line are centered lengthwise to one side of images 100 and 102, respectively, of the bar code. Images 112 and 114 of the first two digits of the identification number are positioned under positive images 100 and 102, respectively.

Machine-readable subfields 60a and 60b can be color-coded with photo-transparent ink to provide rapid visual identification when label unit 10 is applied to a storage jacket. The color can be indicative of year or some other indicator.

The information material in imprint subfield 62a comprises a positive image 144 of the name and address of the medical facility extending parallel to fold line 136. As shown in FIG. 1a, positive image 144 is formed against a photo-transparent background.

The information material in imprint subfield 62b includes a negative image 104 of the bar code or other machine-readable marking and a third image 110 of an interpretation line for the bar code. As shown in FIG. 1a, the third image 110 of the interpretation line is a negative-like image 104 of the bar code. Image 110 of the interpretation line is centered lengthwise to one side of image 104 of the bar code.

Consecutive labels 12 are printed with images 100, 102 and 104 of the bar code which represent consecutive identification numbers, so as to provide unique identification numbers for the radiographs with which they are used.

Imprint subfield 62b further includes information material located as shown in FIG. 1a beneath negative image 104 of the bar code. The additional information material can comprise a negative image 120 of the word "name" and a name blank or box 122 adjacent thereto for entering a patient name therein; a negative image 124 of the word "date" and a date blank or box 126 adjacent thereto for entering the date of the radiograph therein; a negative image 128 of the characters "R#" or similar representation symbolic of the words "radiograph number" or the like and an identification number blank o box 130 adjacent thereto for entering the identification number therein, and a positive image 132 of a logo or other symbol identifying the medical facility.

As shown in FIG. 1a, a substantial portion of imprint subfield 62b is formed with a photo-opaque background, enabling image 104 of the bar code, and images 120, 124, and 128 of the words "name" and "date" and the characters "R#" to be formed as negative (i.e. photo-transparent) images, and blanks or boxes 122, 126, and 130 to appear as photo-transparent windows. The use of blanks or boxes 122, 126, and 130 makes the information entered therein easier to find and read on the label unit 10.

Figure 7A:
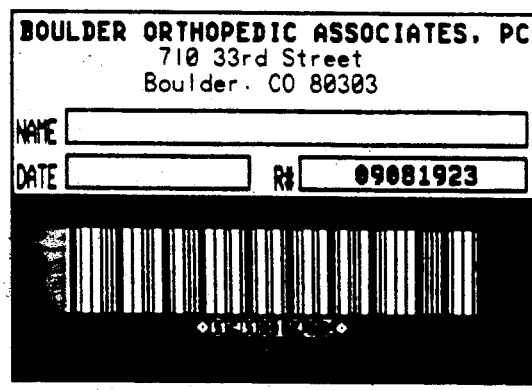
Figure 7B:
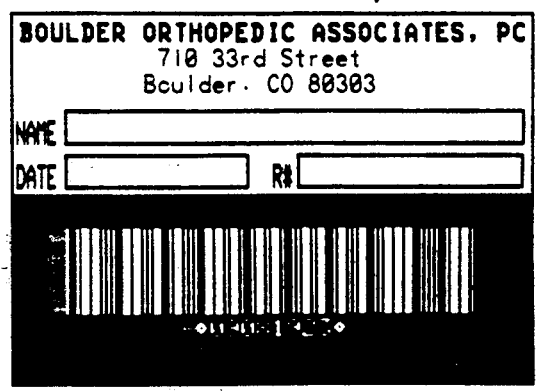
Figure 7C:
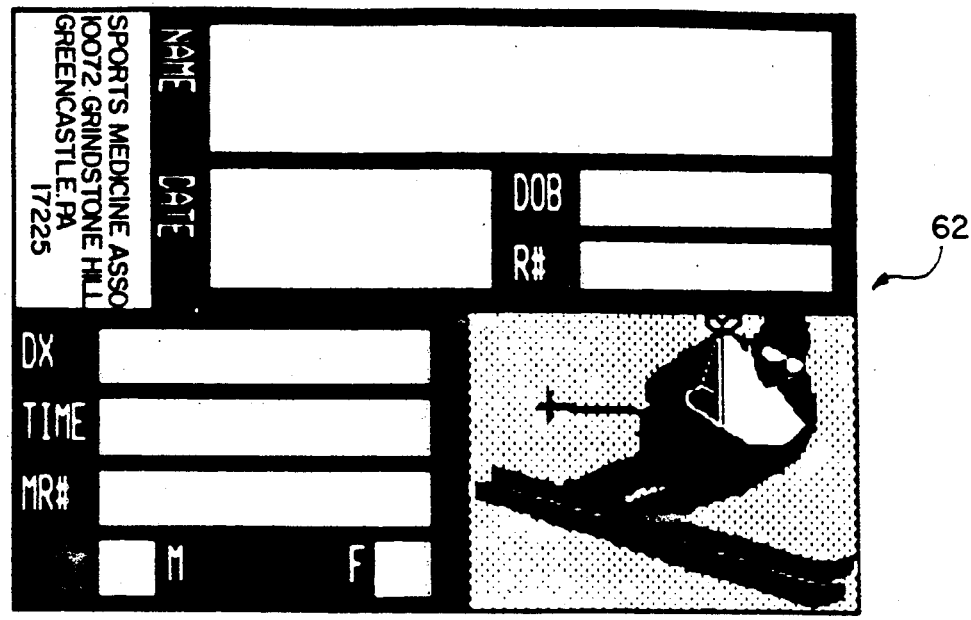
Figure 7D:
Figure 8E:
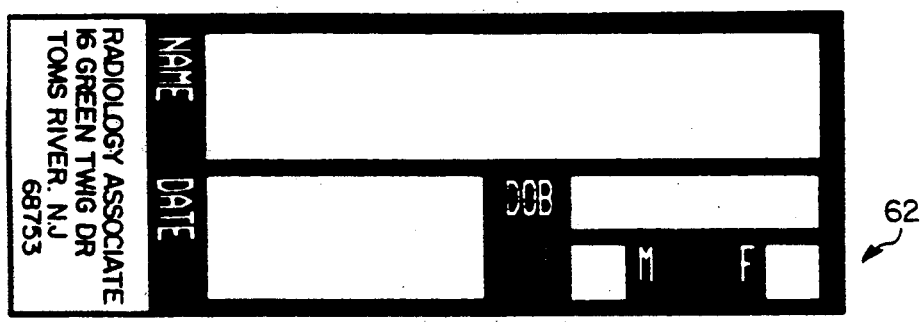
FIGS. 8a through 8z are top plan views of labels according to the invention showing alternative forms for the print information material included in the imprint field for conventional and X-Omatic TM imprinters.
Figure 8F:
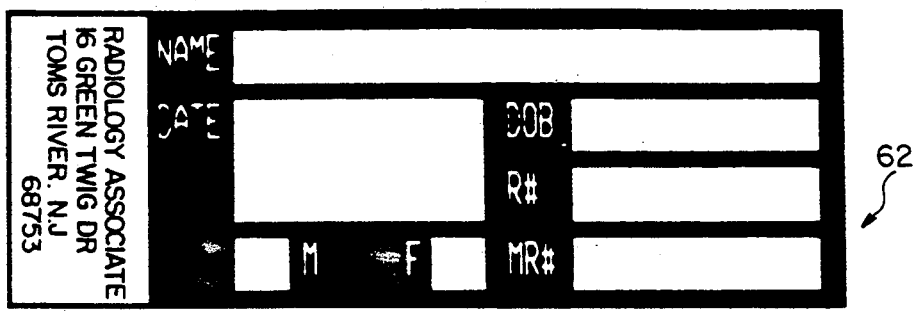
Figure 8G:
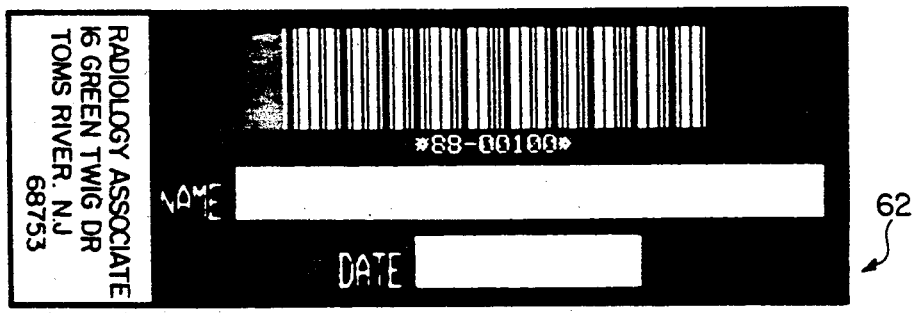
Figure 8H:
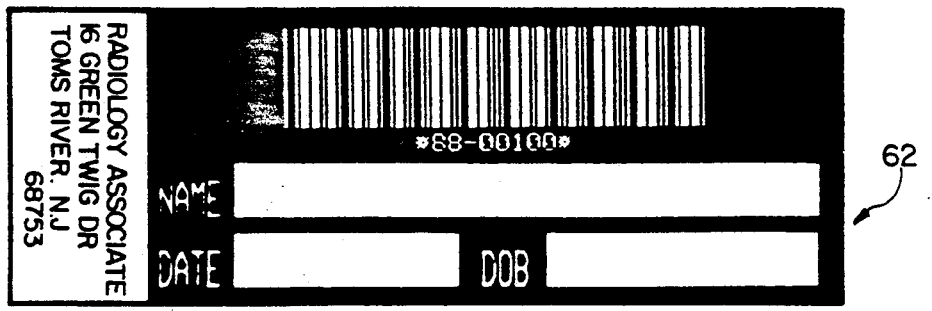
Figure 8I:
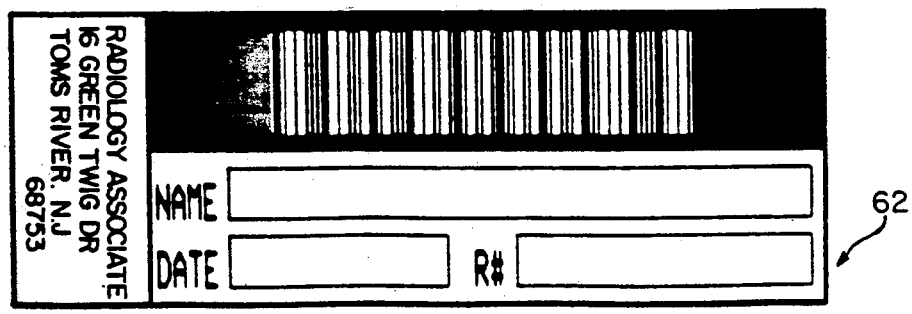
Figure 8J:
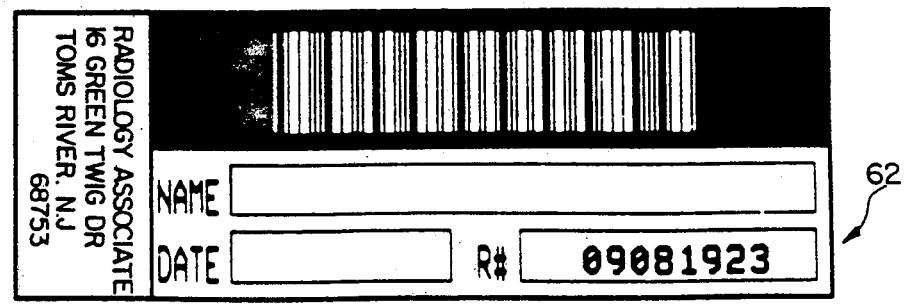
Figure 8K:
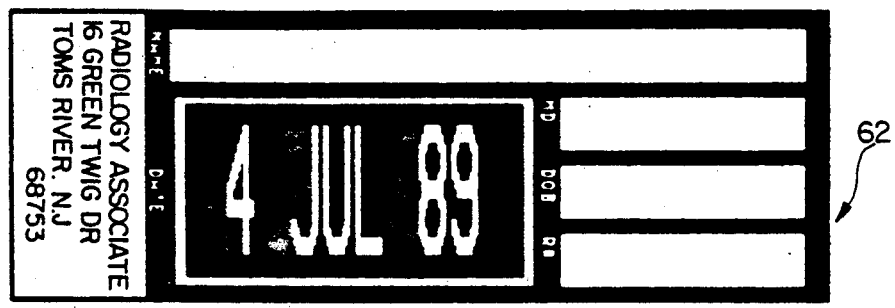
Figure 8L:
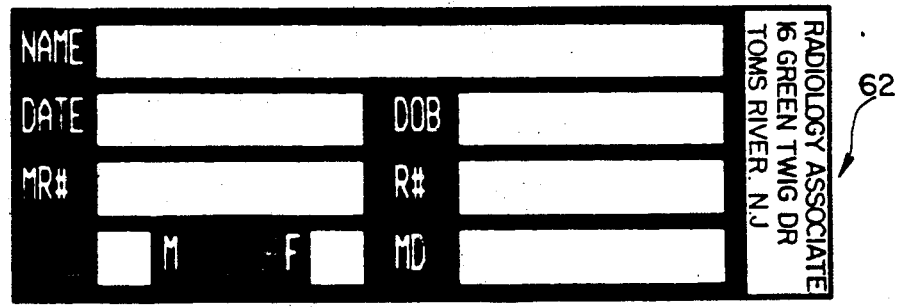
Figure 8Q:
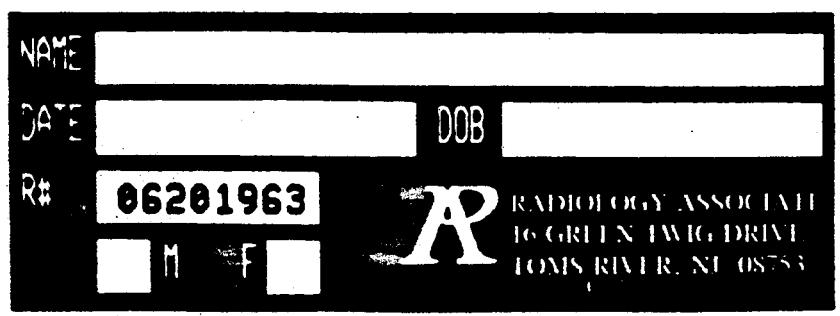
Figure 8R:
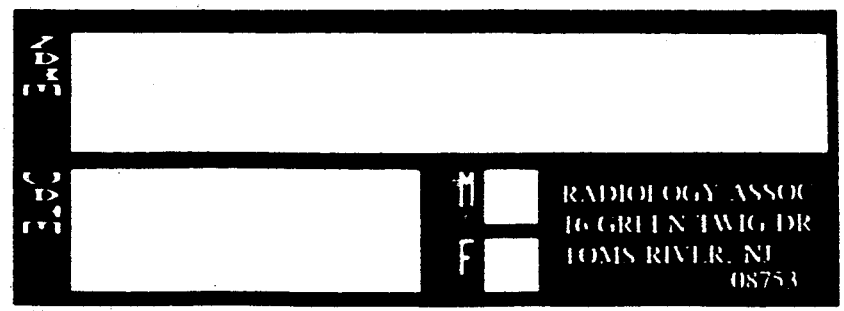
Figure 8S:
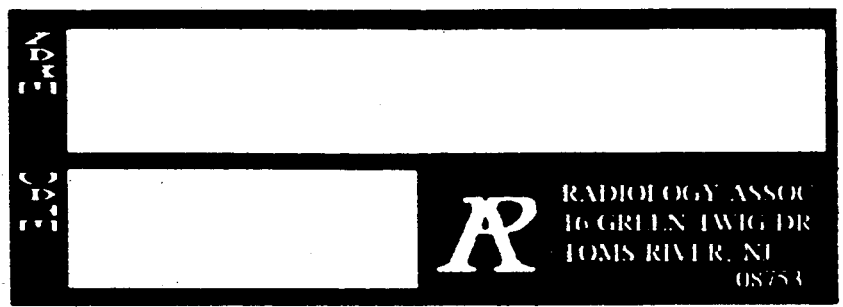
Figure 8T:
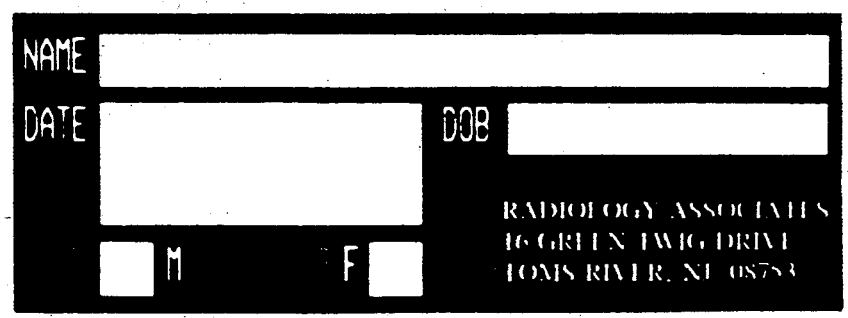
Figure 8Y:
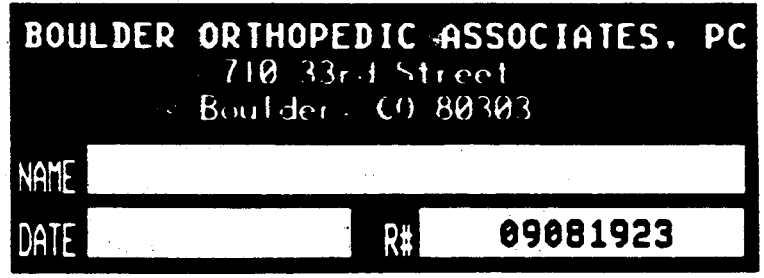
Figure 8Z:
Figure 9A:
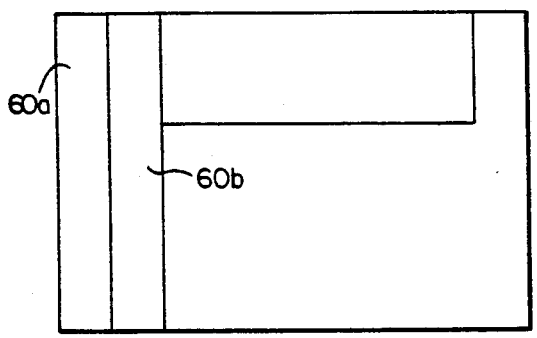
FIGS. 9a through 9i are top plan views of labels according to the invention showing alternative forms for the print information material included in th machine-readable field for an X-Omatic TM imprinter.
Figure 9B:
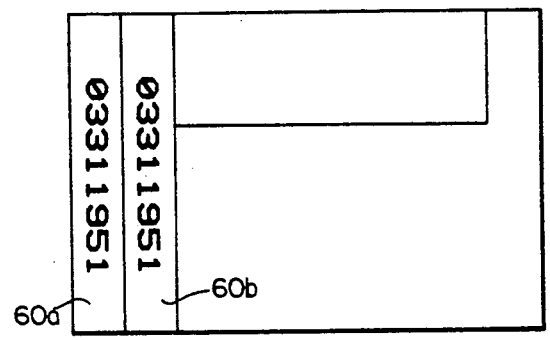
Figure 9C:
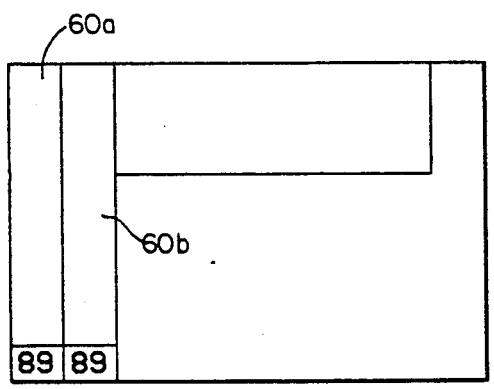
Figure 9D:
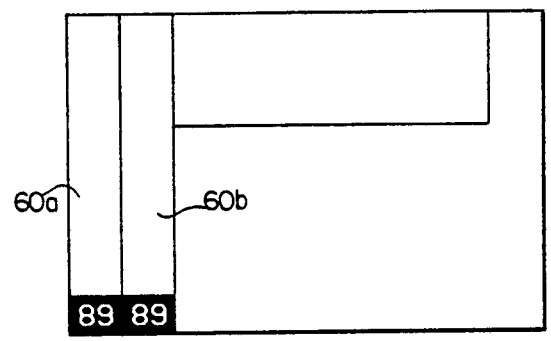
Figure 9E:
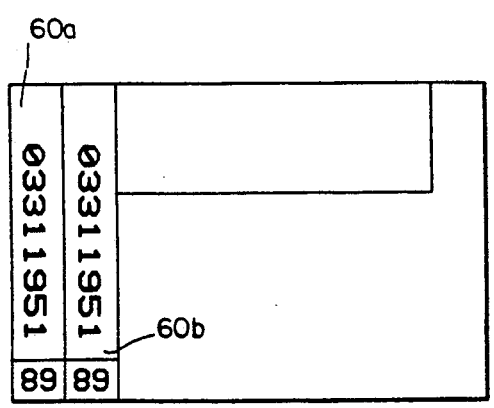
Figure 9F:
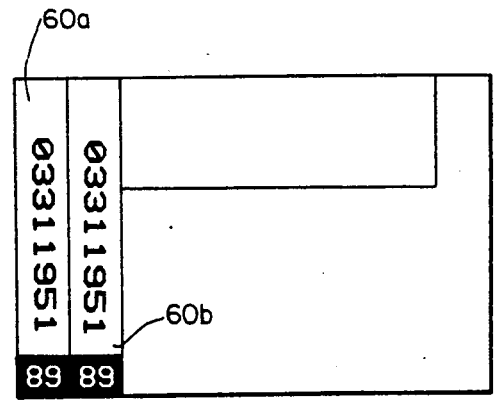
Figure 9G:
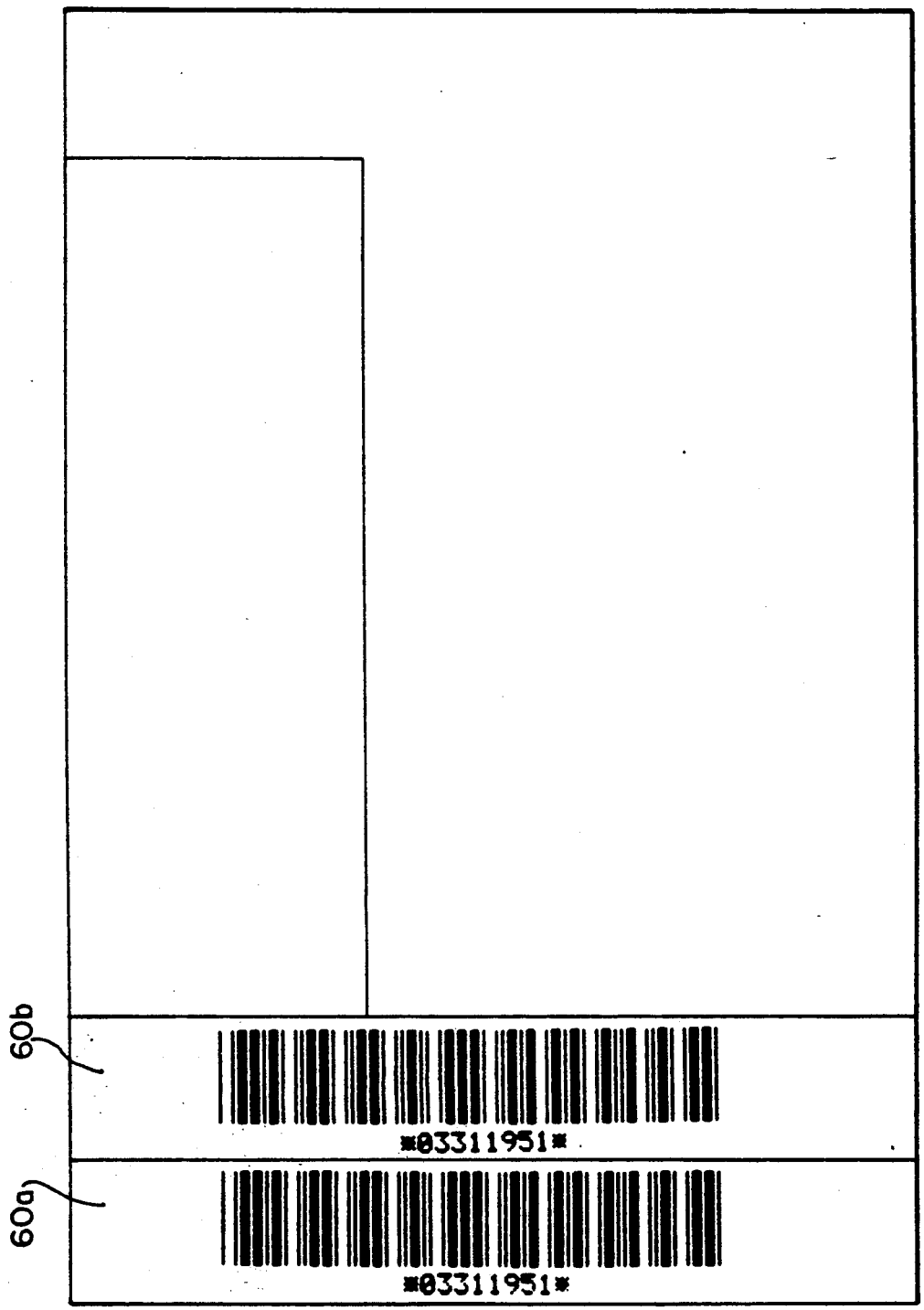
Figure 9H:
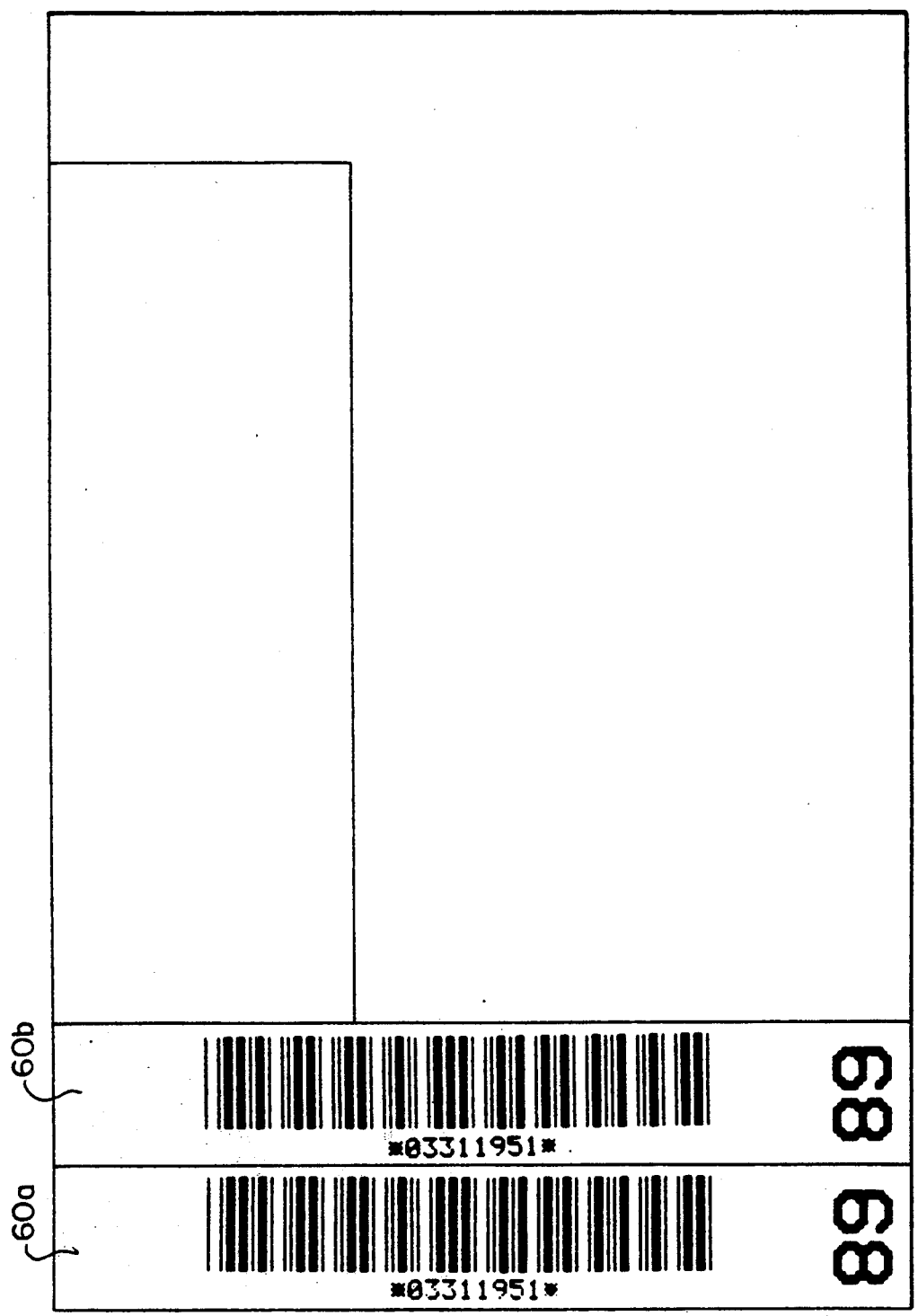
Figure 9I:
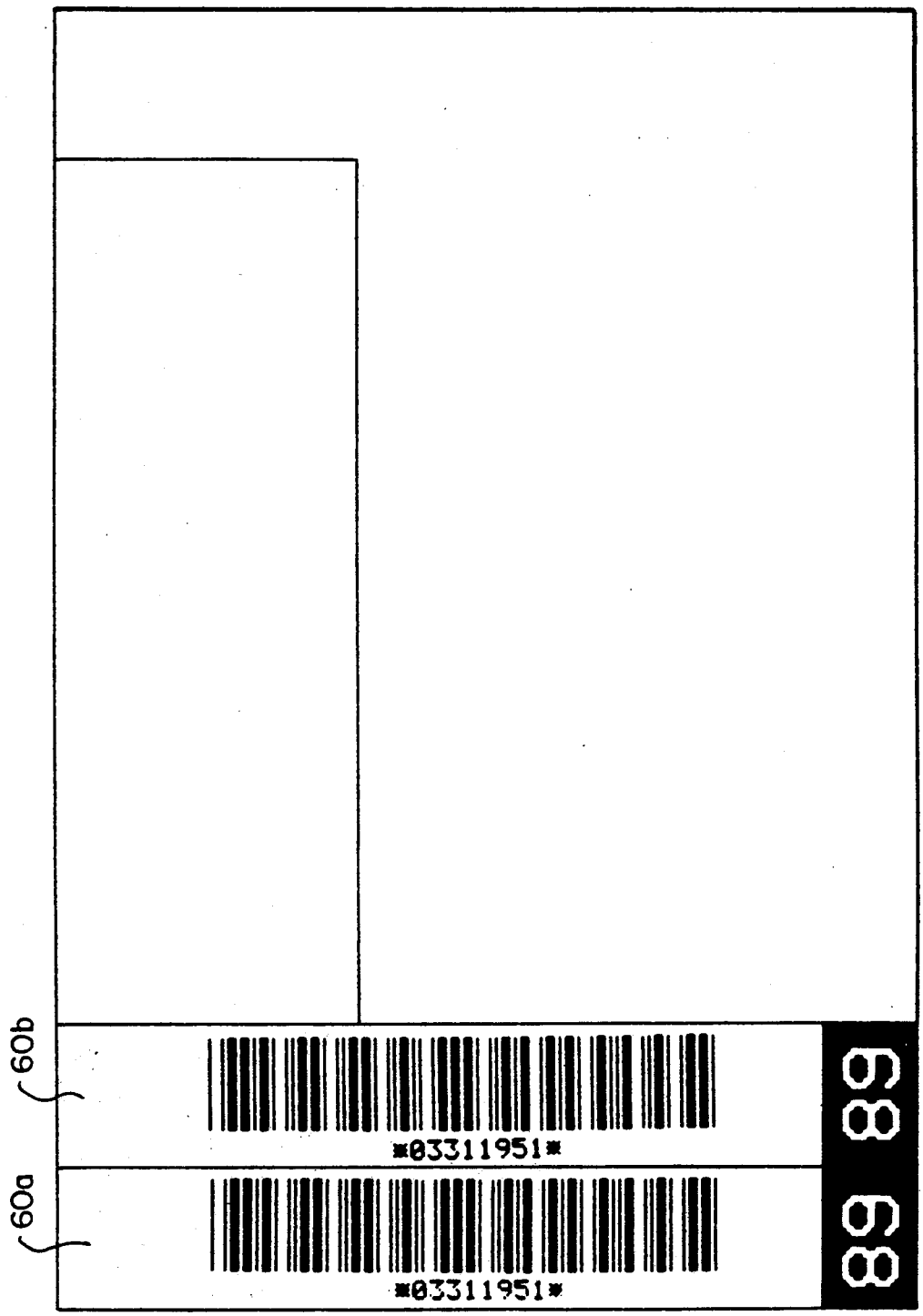
Figure 10A:
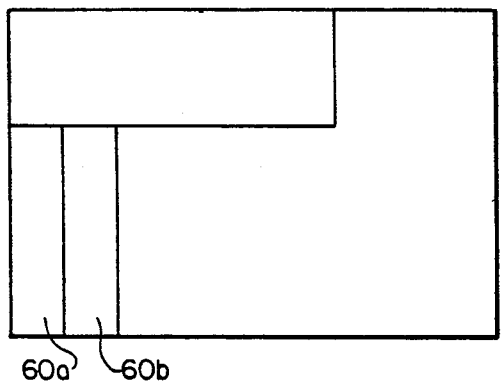
FIGS. 10a through 10i are top plan views of labels according to the invention showing alternative forms for the print information material included in the machine-readable field for a conventional imprinter.
Figure 10B:
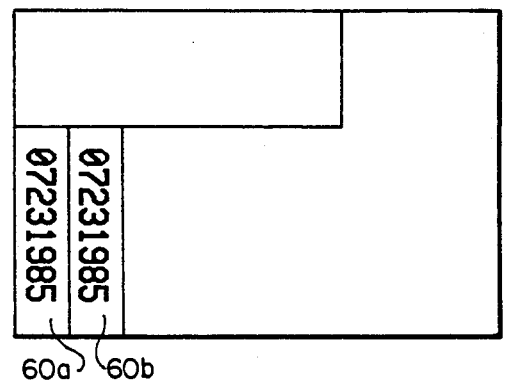
Figure 10C:
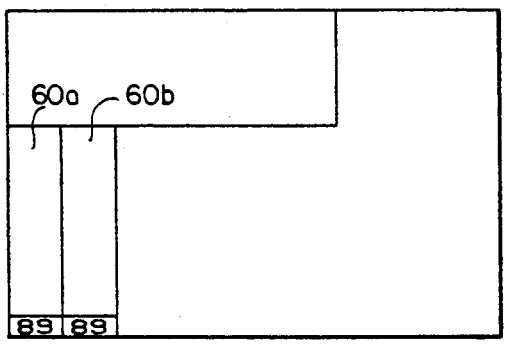
Figure 10D:
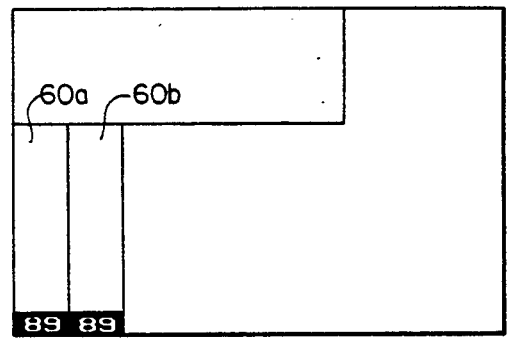
Figure 10E:
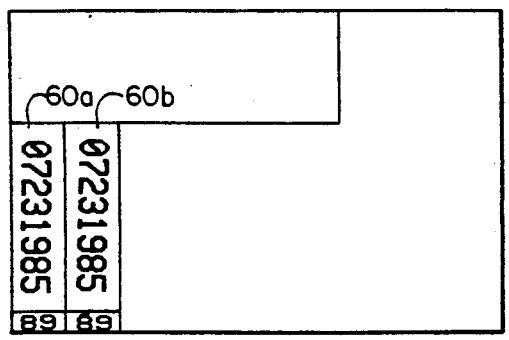
Figure 10F:
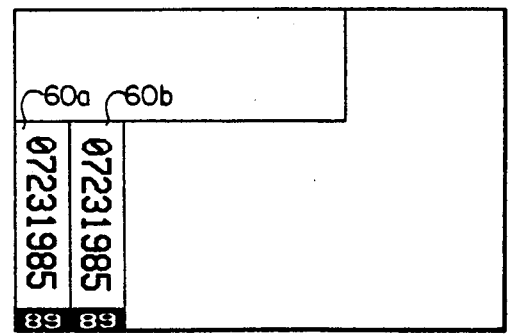
Figure 10G:
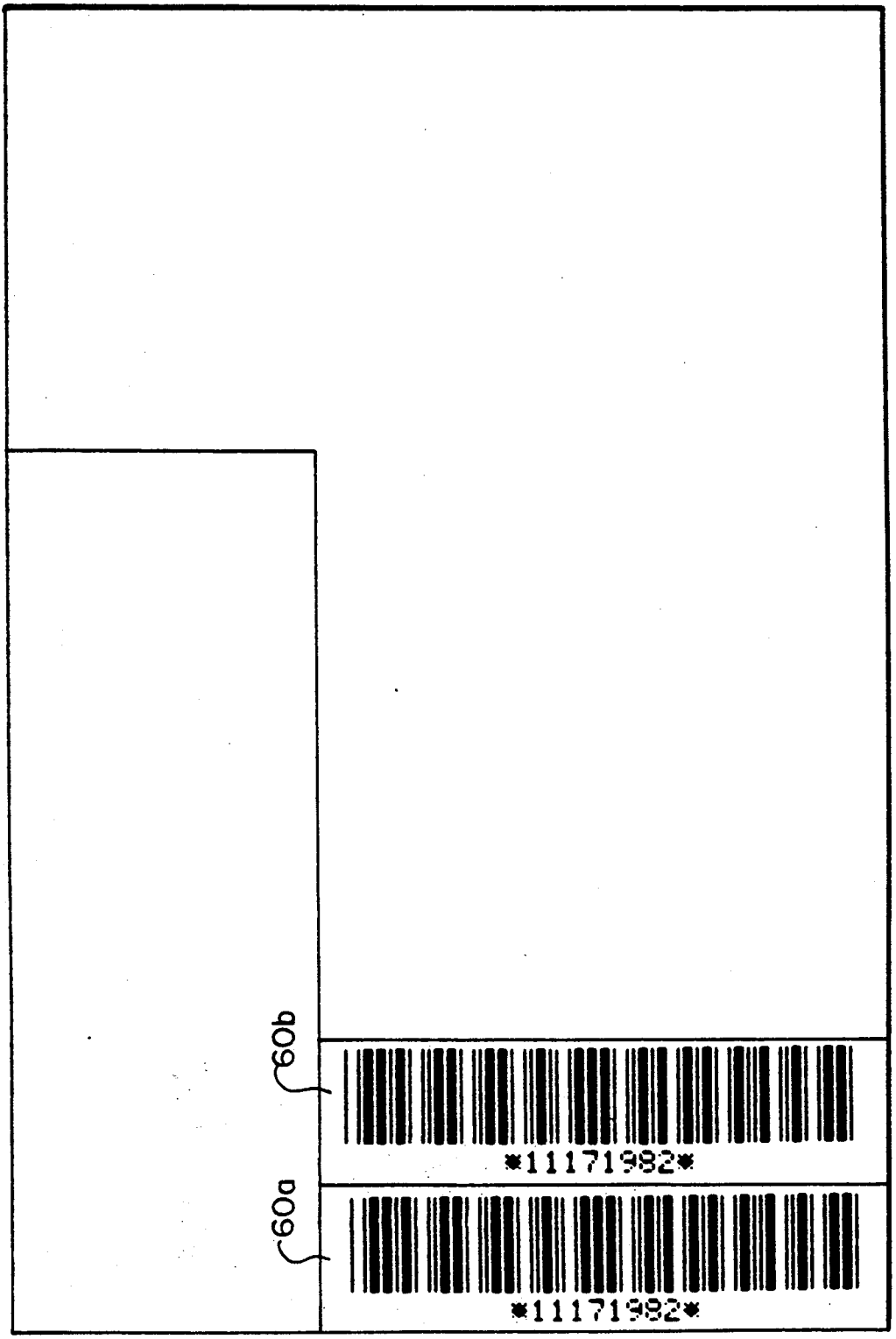
Figure 10H:
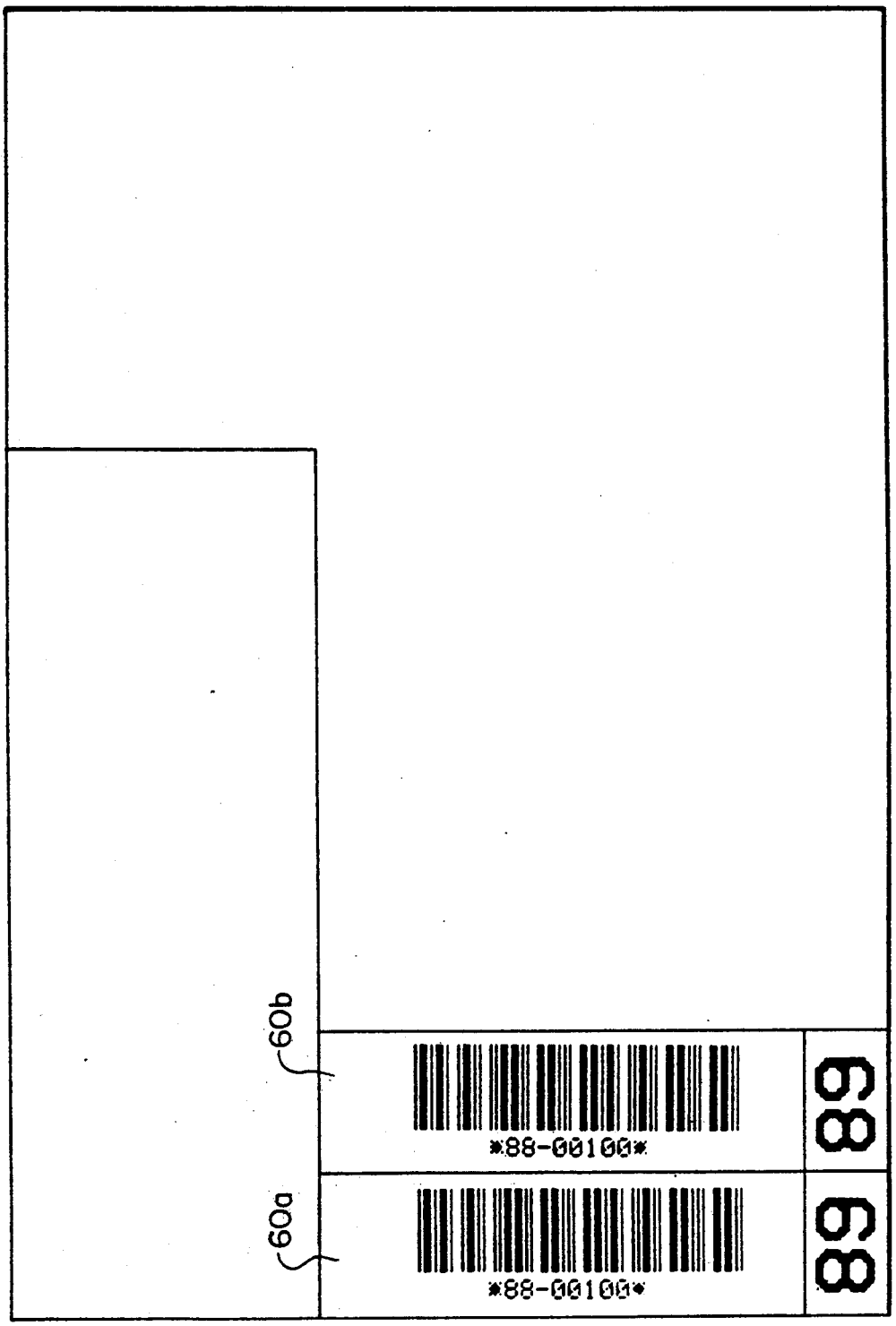
Figure 10I:
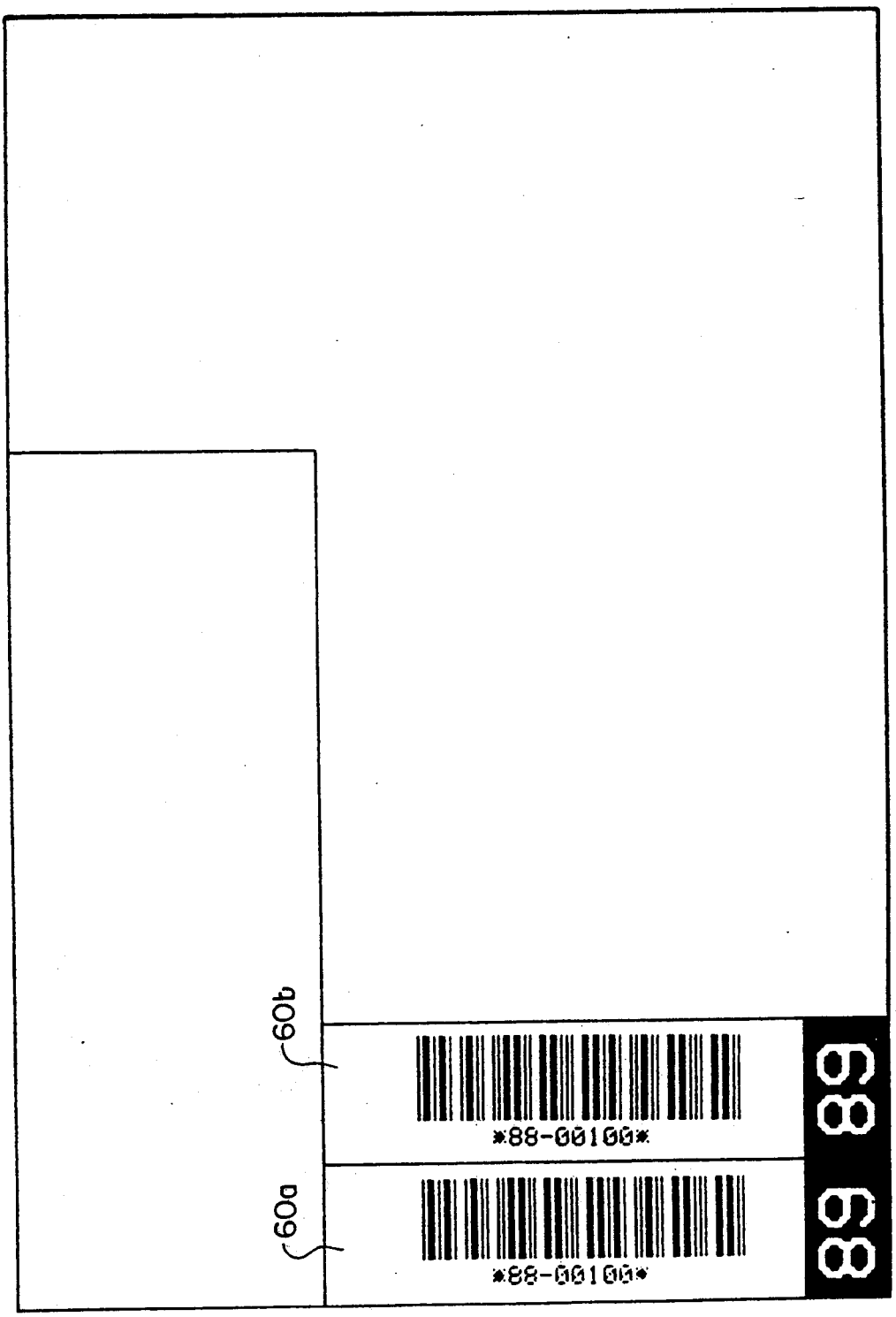

As a rule, photo-transparent windows are used for variable information such as patient name, date, and radiograph number. Permanent information, such as the name and address of the medical facility, can appear as a positive image 144 against a photo-transparent background, as shown in FIG. 1a, or as a negative image on a photo-opaque background, for example as shown in FIGS. 7f and 7g.

As shown in FIG. 1a, image 120 of the word "name" and name blank 122 are positioned under negative image 104 of the bar code, image 124 of the word "date" and date blank 126 and image 128 of the characters "R#" and identification number blank 130 are positioned under image 120 and name blank 122 and image 132 of the logo is positioned to the right of negative image 104 of the bar code above name blank 122. As shown in FIG. 1a, the identification number is preprinted in blank 130 as a positive image 134.

The name and date can be written or typed in name blank 122 and date blank 126. Due to the use of the photo-opaque background, the name and date when printed on the radiograph will appear as transparent images against a black window, providing a more striking and readable appearance than is available with the prior art devices, and makes the information easier to locate and read on the radiograph.

Alternatively, the date can be provided using an adhesive secondary or sublabel 136, shown in FIG. 1b. As shown in FIG. 1b, sublabel 136 preferably provides a negative image 138 of the date, for a purpose to be described hereinafter. Like label 12, sublabel 136 is made of a maximally photo-transparent material and has a maximally photo-transparent adhesive backing, while the ink is photo-opaque. The adhesive can be releasable, so that sublabel 136 can be reused, or it can be permanent. Also, sublabel 136 can be placed directly on label 12 or on a clear plastic sleeve 139, shown in FIG. 1c, which fits over label unit 10, enabling sublabel 136 to be reused.

A partial list of possible categories for use in background subfields 64a and 64b is set forth in the accompanying Table:

TABLE

| Categories For Background Subfields | | |
|---|---|---|
| # Radiographs Enc. | Date | Physician Code |
| 2 × 2's in Slide File | DOB | Physician's Name |
| Age | DV | Post-Op |
| Alimentary | DV, VD, Lateral | Post-Surgical |
| Anatomic Field | Echocardiography | Pre-Op |
| Angiocardiography | EKG Enclosed | Pre-Surgical |
| Angiography | Esophogram | Quantum Mottle |
| Arthrography | Fluoroscopy | Radiologist's |
| Arthroscopy | Grid | Report |
| Bar Codes | History | Radiology # |
| Barium | IVP | Referring |
| Barium Enema | KVP | Physician |
| Bibliography | Lecture Code | SSN |
| Cassette: 10 × 12 | MAS | Teaching File |
| Cassette: 14 × 17 | MD | Time |
| Cervical | MR # | Ultrasound |
| Cholecystography | Myelogram | Urethrogram |
| Colon | Necropsy | Urogram |
| Consultation | Non-grid | Videoradiography |
| Contrast | Pathology # | Volume # |
| | | Year(s) |

The information material in background subfield 64a comprises a first category list 150 for indicating the nature of the radiographic study. As shown in FIG. 1a, first category list 150 comprises a plurality of categories 152 denoting the body part or system to be studied, for example "skull & contents," "cervical spine," "thoracic spine," etc., and having a plurality of boxes 154 associated therewith and arranged in adjacent columns, enabling the doctor to mark in the appropriate box 154 the body part or system to be studied.

The information material in background subfield 64b comprises a second category list 160 for indicating the nature of the radiographic study. As shown in FIG. 1a, second category list 160 comprises plurality of additional categories 162 having plurality of boxes 164 associated therewith and arranged in adjacent columns, enabling the doctor to mark in the appropriate box 164 additional factual information concerning the nature of the radiographic study, for example the type of radiographic study which is to be performed.

The information material in background subfield 64c comprises a negative image 170 of the name of the medical facility or an abbreviation thereof.

Figure 2:
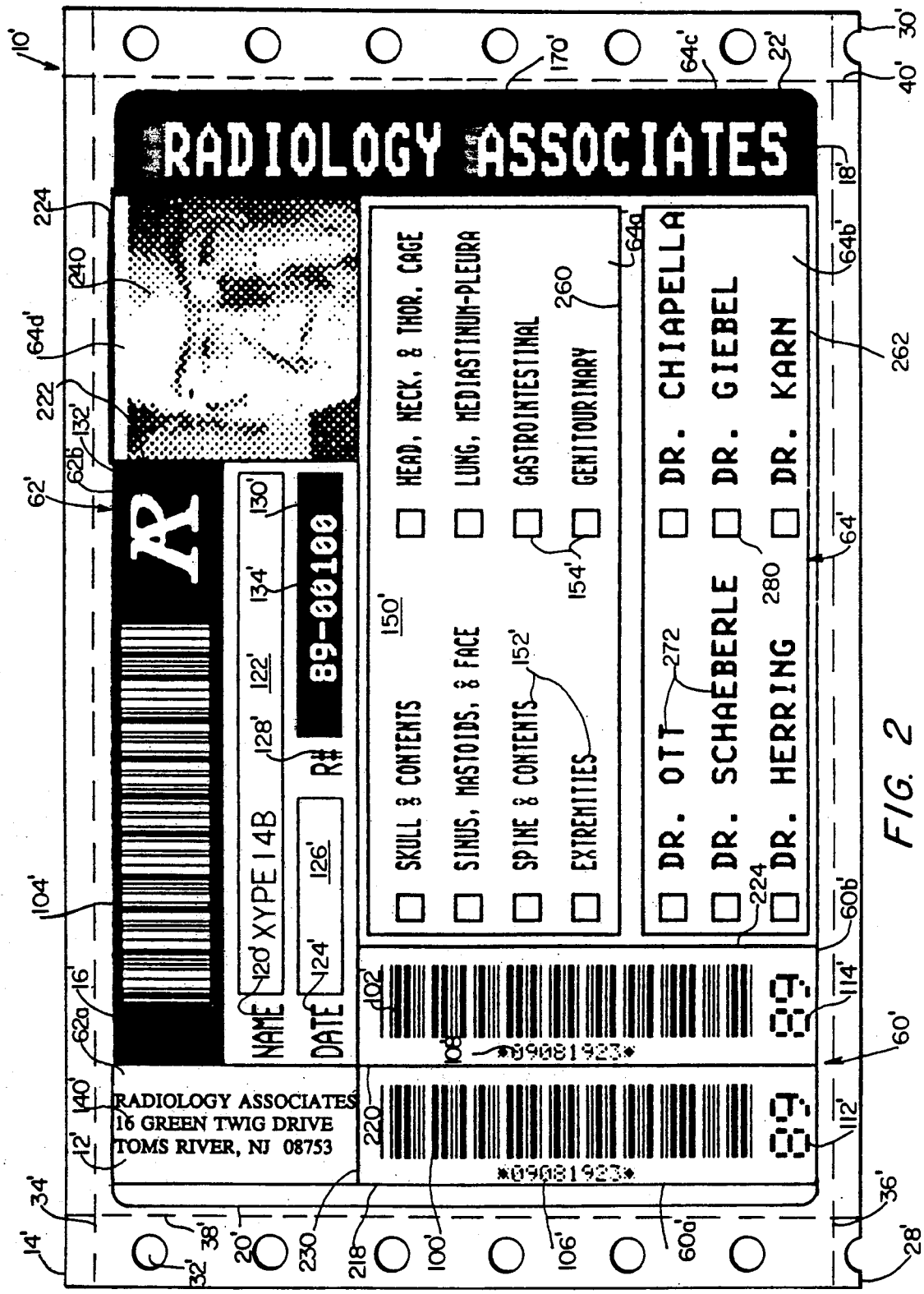
FIG. 2 is a top plan view of a second embodiment of a labeling unit according to the invention.
Figure 3:
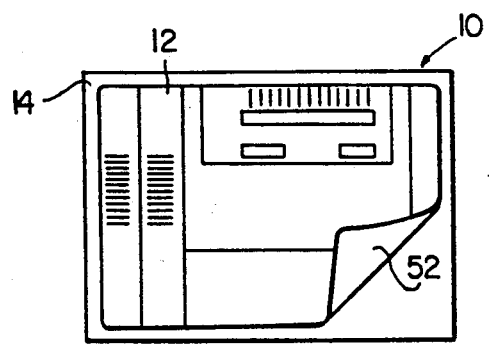
FIG. 3 is a top plan view of the embodiment of FIG. 1a with one corner of the label turned back.

In accordance with the invention, the relative positioning of information fields 60, 62 and 64 can be varied in accordance with the type of imprinter used, and the content and arrangement of the print information material contained therein can be varied in accordance with the needs of the medical facility while still achieving the objects and advantages of the invention. Referring now to FIG. 2, there is shown a second embodiment of a radiographic imprinting and labeling unit 10' according to the invention incorporating such variations.

Label unit 10' also comprises a rectangular label 12' having opposed top and bottom edges 16' and 18' and opposed left and right edges 20' and 22' and a release liner 14' to which label 12' is releasably attached. Label 12' is divided into three information fields: Machine-readable field 60', imprint field 62' and background field 64'. Machine-readable field 60' is divided into two subfields 60a' and 60b', imprint field 62' is divided into two subfields, 62a' and 62b', and background field 64' is divided into four subfields, 64a', 64b', 64c' and 64d'.

Information fields 60, 62 and 64 include print information material and are separated from each other by a plurality of dividing lines 220, 222, 224, 226 and 228.

Machine-readable field 60' is positioned on label 12' adjacent an edge of label 12' for a purpose to be described hereinafter. Machine-readable subfield 60a' is bounded on the left by dividing line 218 adjacent left edge 20' of label 12', at the top by the left portion of dividing line 230, at the bottom by bottom edge 18' of label 12', and on the right by the lower portion of dividing line 220. Machine-readable subfield 60b' is bounded on the left by dividing line 220, at the top by the left center portion of dividing line 230, at the bottom by the bottom edge 18' of label 12', and on the right by dividing line 224.

Imprint field 62' is positioned on label 12' to align with the light window of a Kodak TM X-Omatic TM imprinter. Imprint subfield 62a' is bounded on the left by dividing line 218 adjacent left edge 20' of label 12', at the top by top edge 16' of label 12', at the bottom by the left portion of dividing line 230, and on the right by the upper portion of dividing line 220. Imprint subfield 62b' is bounded on the left by the upper portion of dividing line 220, at the top by top edge 16' of label 12', at the bottom by the center portion of dividing line 230 and on the right by dividing line 222.

Background field 64' occupies the remaining space on label 12'. Background subfield 64a' is positioned to the left of machine-readable subfield 60b' and is bounded by a rectangular boundary box 260. Background subfield 64b' is positioned under background subfield 64a', and is bounded by a rectangular boundary box 262. Background subfield 64c' is positioned to the right of background subfields 64a' and 64b' and extends from top edge 16' to bottom edge 18' of label 12'. It is bounded on the left by dividing line 224 and on the right by right edge 22' of label 12'. Background subfield 64d' is positioned between imprint field 62 and background subfield 64c', and is bounded on the left by dividing line 222, at the top by top edge 16' of label 12', at the bottom by the right portion of dividing line 230, and on the right by the upper portion of dividing line 224.

Dividing line 220 separating machine-readable subfield 60a' and imprint subfield 62a' from machine-readable subfield 60b' and imprint subfield 62b' extends substantially all the way across label 12' from top edge 16' to bottom edge 18' and defines a fold line 136' for a purpose to be described hereinafter.

Fold line 136' defines a front portion 140' of label 12' to the right side thereof, comprising machine-readable subfield 60b', imprint subfield 62b', background field 64' and a back portion 142' of label 12' to the left side thereof, comprising machine-readable subfield 60a' and imprint subfield 62a'. Machine-readable subfield 60a' and imprint subfield 62a' are the only information subfields on back portion 142'.

Machine-readable subfield 60a' includes information material comprising a first positive image 100' of a bar code or other machine-readable marking representing an identification number for identifying the radiograph.

Machine-readable subfield 60b' includes information material comprising a second positive image 102' of the bar code or other machine-readable marking. Machine-readable subfields 60a' and 60b' can be color coded with an ink which transmits white light, for a purpose to be discussed hereinafter.

The information material in machine-readable subfields 60a' and 60b' can further comprise first and second positive images 106' and 108', respectively, of an interpretation line for the bar code. Some portion of the identification number, for example the first two digits as shown in FIG. 2, can represent the year. Enlarged first and second positive images 112' and 114' of the first two digits can also be included in machine-readable subfields 60a' and 60b'.

Imprint subfield 62a' includes information material comprising a positive image 144' of the name and address of the medical facility.

Imprint subfield 62b' includes information material comprising a negative image 104' of the bar code or other machine-readable marking and a negative image 132' of a logo or other symbol identifying the medical facility. Imprint subfield 62b' further includes information material comprising a positive image 120' of the word "name" and a name blank or box 122' adjacent thereto for entering a patient name therein; a positive image 124' of the word "date" and a date blank or box 126' adjacent thereto for entering the date of the radiograph therein; and a positive image 128' of the characters "R#" or similar representation symbolic of the words "radiograph number" or the like and an identification number blank or box 130' adjacent thereto for entering the identification number therein. As shown in FIG. 2, the identification number is pre-printed in blank 130' as a negative image 134'.

The information material in background subfield 64a' comprises a category list 150' for indicating the body part or system to be studied. As shown in FIG. 2, category list 150' comprises a plurality of categories 152' denoting the body part or system to be studied, for example "skull & contents", "sinus, mastoids, & face", "spine & contents", etc., and having a plurality of boxes 160' associated therewith and arranged in adjacent columns, enabling the doctor to mark in the appropriate box 160' the body part or system to be studied.

The information material in background subfield 64b' comprises a plurality of doctor's names 270 having a plurality of boxes 280 associated therewith and arranged in adjacent columns, enabling the doctor to mark his name in the appropriate box 280.

The information material in background subfield 64c' comprises a negative image 146' of the name of the medical practice or an abbreviation thereof.

The information material in background subfield 64d' comprises a pictorial representation 240, for example a copy of a photograph of the face of the patient, as shown in FIG. 2.

Other alternative configurations of information fields 60, 62 and 64 and alternative forms of print information material for inclusion therein are illustrated in FIGS. 6 through 11. Referring now to FIGS. 6a through 6f, there are shown alternative configurations and positions for imprint field 60. The configuration shown in FIG. 6a is for use with a Kodak "X-Omatic" imprinter; the configuration shown in FIG. 6b is for use with a conventional imprinter; the configurations shown in FIGS. 6c through 6e are for use with a cassette with two blockers, and the configuration shown in FIG. 6f is for use with a custom imprinter.

Referring now to FIGS. 7a through 7g and 8a through 8z, there are shown alternative forms for the print information material for inclusion in imprint field 62. The print information material can comprise a positive image only (FIGS. 8v and 8w), a negative image only (FIGS. 7f, 7g, 8a, 8n, 8p, 8r through 8u, and 8x), or a combination of positive and negative images (FIGS.

7a through 7e, 8b through 8m, 8o, 8q, and 8y). The print information material can also be printed as a mirror image (FIG. 8z), so that the printed information will be readable if the radiograph is placed on the imprinter face down. A radiograph can also be imprinted using a label unit 10 having an imprint field 62 in which the print information material is printed both forwards and backwards (i.e. in mirror image), so that printed information on the radiograph can be read from either side of the radiograph.

Imprint fields 62 illustrated in FIGS. 7a through 7g are sized for use with custom imprinters, while imprint fields 62 illustrated in FIGS. 8a through 8g are sized for use with conventional and X-Omatic TM imprinters.

Referring now to FIGS. 9a through 9j and 10a through 10j, there are shown alternative forms for the print information material for inclusion in machine-readable field 60. As shown in FIGS. 9g through 9i and FIGS. 10g through 10i, subfields 60a and 60b can include a positive image of a bar code and an interpretation line for the bar code. Other alternatives include, but are not limited to, a positive or negative image of the last two digits of the year (FIGS. 9c through 9f, 9h, 9i, 10c through 10f, 10h and 10i) and a positive image of machine readable numerals (FIGS. 9b, 9e, 9f, 10b, 10e, and 10f).

Also, as shown in FIGS. 9a, 9c, 9d, 10a, 10c and 10d, the machine-readable code or numerals can be omitted and subfields 60a and 60b can simply be color-coded for the year or the like. Machine-readable fields 60 illustrated in FIGS. 9a through 9i are positioned for use with an X-Omatic TM imprinter, while machine-readable fields 60 illustrated in FIGS. 10a through 10i ar positioned for use with a conventional imprinter.

Figure 11A:
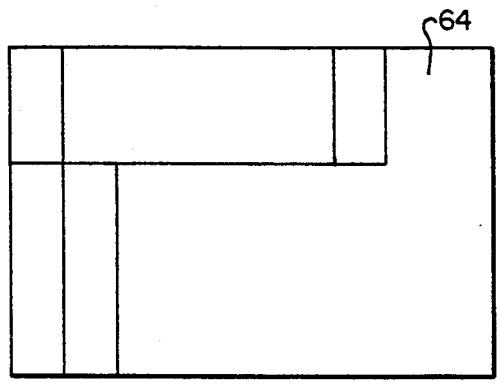
FIGS. 11a through 11j are top plan views of labels according to the invention showing alternative forms for the print information material included in the background field.
Figure 11C:
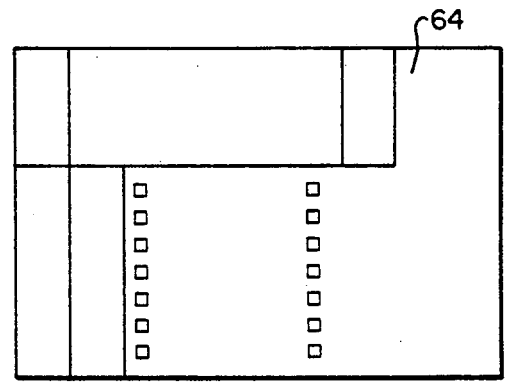
Figure 11D:
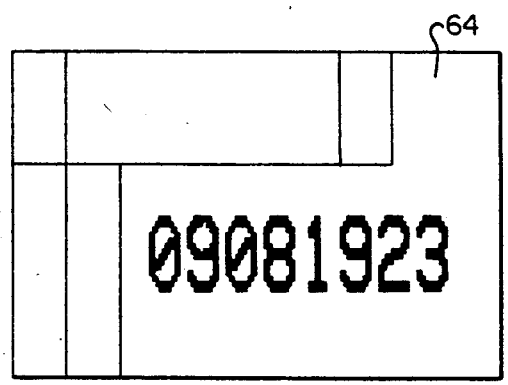
Figure 11F:
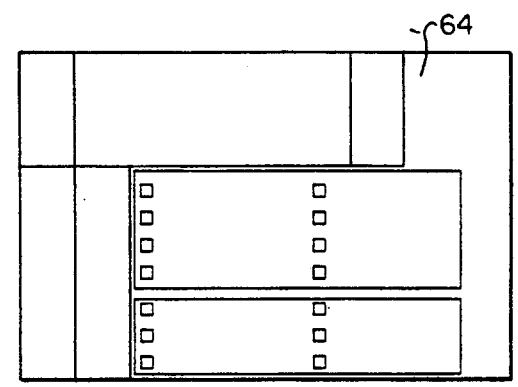
Figure 11G:
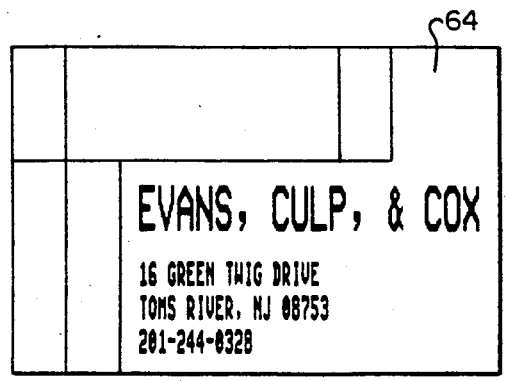
Figure 11H:
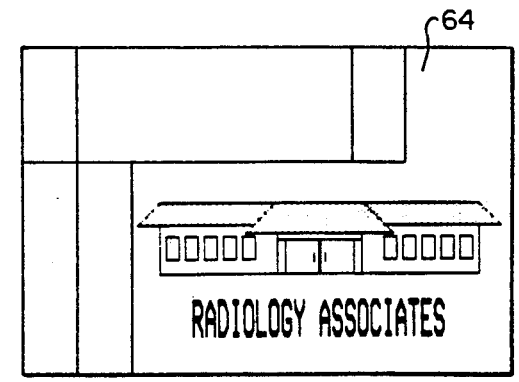
Figure 11B:
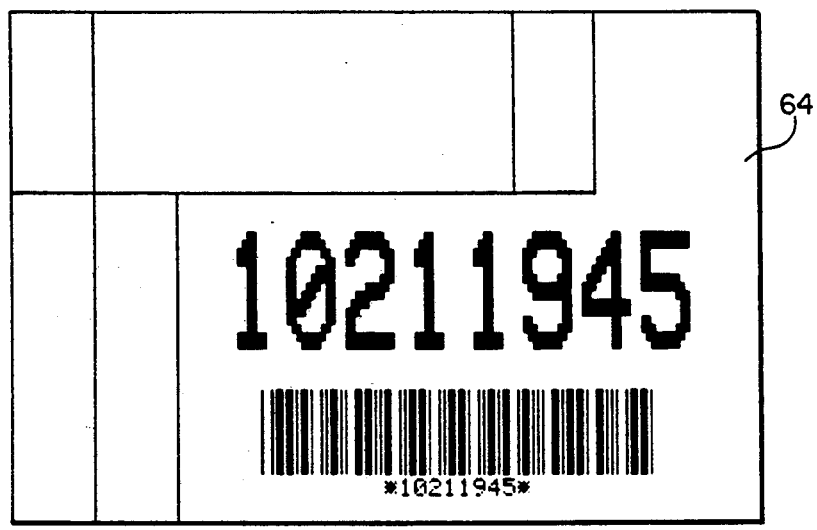
Figure 11E:
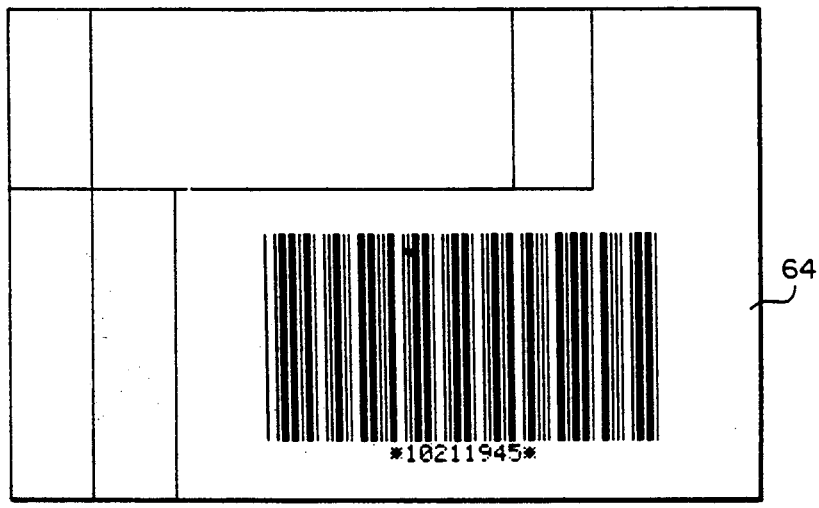
Figure 11I:
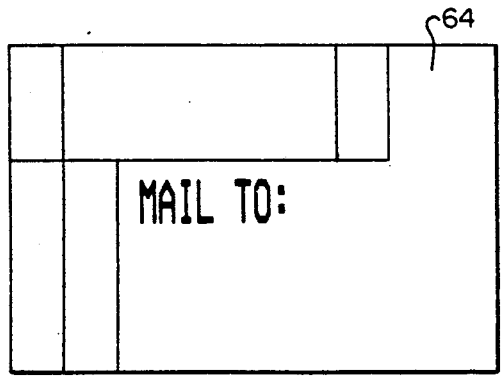
Figure 11J:
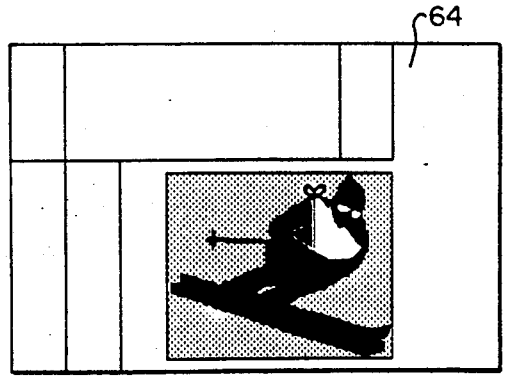
Figures 12A, 12B:
FIGS. 12a through 12f are top plan views of labels according to the invention incorporating some of alternative forms for the print information material of FIGS. 8 through 11.
Figures 12C, 12D:
Figure 12E:
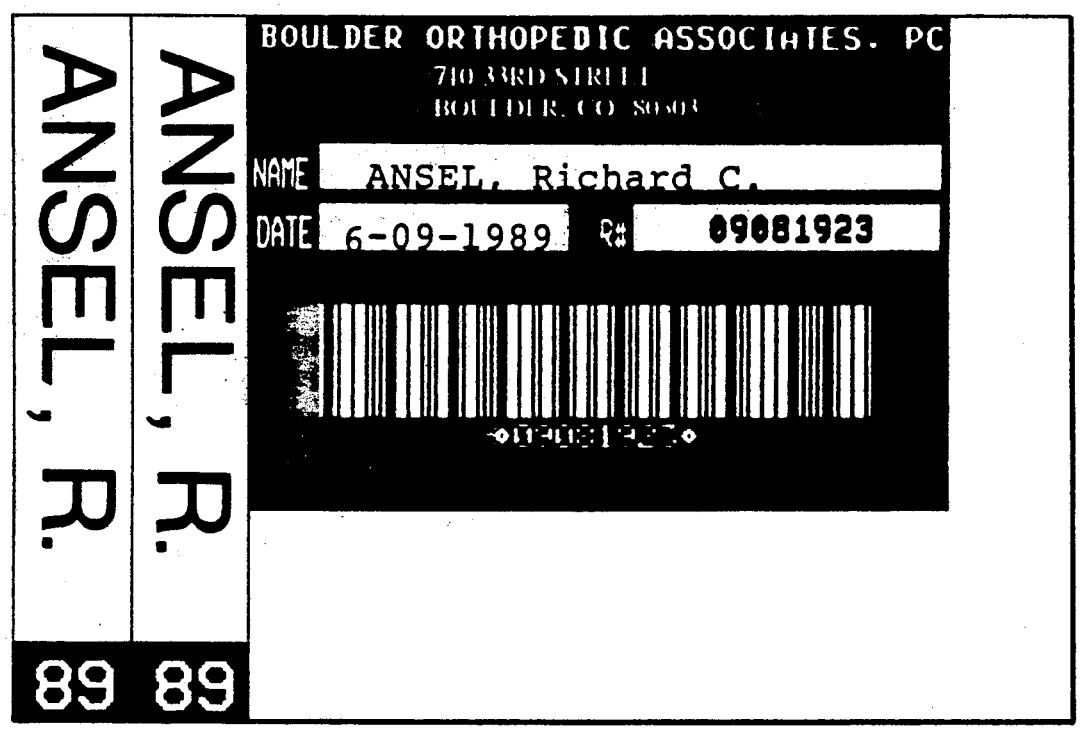
Figure 12F:
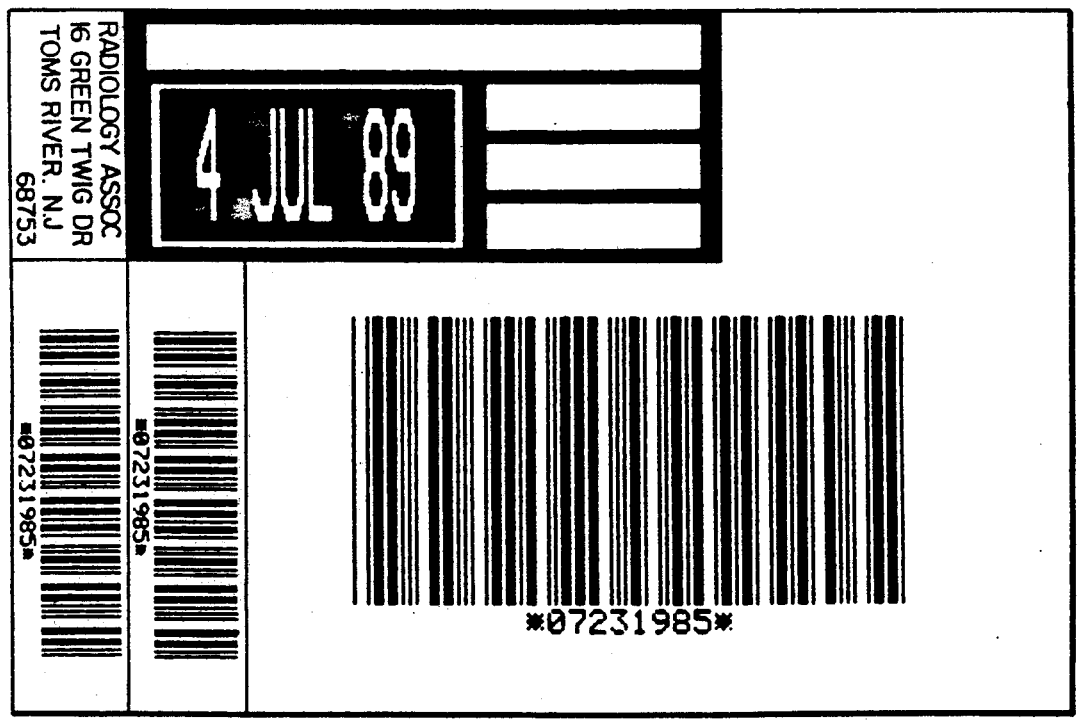

Referring now to FIGS. 11a through 11j, there are shown alternative forms for the print information material included in background field 64. The boxes illustrated in FIGS. 11c and 11f can be used with the categories set forth in the Table or with other categories of the user's choice. Other alternatives include, but are not limited to, machine-readable bar code and/or numerals (FIGS. 11b, 11d and 11e), the name and address of the medical facility (FIG. 11g), and logos (FIGS. 11h and 11j). Background fields 64 illustrated in FIGS. 11a-11j are positioned for use with a conventional imprinter but can be varied in accordance with the invention for use with other types of imprinters.

Referring now to FIGS. 12a through 12f, there are shown labels 12 incorporating some of the alternatives shown in FIGS. 8 through 11 as well as other, additional alternatives not shown therein.

All of the graphic material, i.e., the information material and dividing lines, on labels 12 and 12' and the negative image on sublabel 136 can be generated by commercially available computer software using commercially available personal computers and computer printers. For example, Data Specialties, Inc., of Northbrook, Ill. provides its Zebra TM 130 thermal transfer demand printer for printing bar-coded labels and its Zebra Programming Language (ZPL) for designing and formatting the labels, including text, graphics and bar codes. Integrated Software Design, Inc., of Mansfield, Mass., provides "The Generalized Bar Code and Labeling System" (GBL) for use with an IBM personal computer and a Printronix printer, for designing and formatting labels including text, graphics and bar codes. Logo Grab, also provided by Integrated Software Design, Inc., is a memory resident software module for use with GBL that captures any graphics screen on a personal computer and converts it to a picture or logo to be used on a label generated by GBL or another ISD bar code and labeling software package. Thus, pictorial representation 240, for example, can be produced from a photograph, for example, using an optical scanner to convert the photograph into digital signals which can be downloaded onto label 12' by the software.

Label units 10 and 10' are used in the same way to photographically imprint information onto radiographic film, imprint field 62' in label unit 10' being positioned for use with the Kodak X-Omatic printer and imprint field 62 in label unit 10 being positioned for use with all other conventional printers. For purposes of illustration, reference will be made to label unit 10, although it should be understood that label unit 10' can be substituted therefor without any change in the method of use.

Figure 5A:
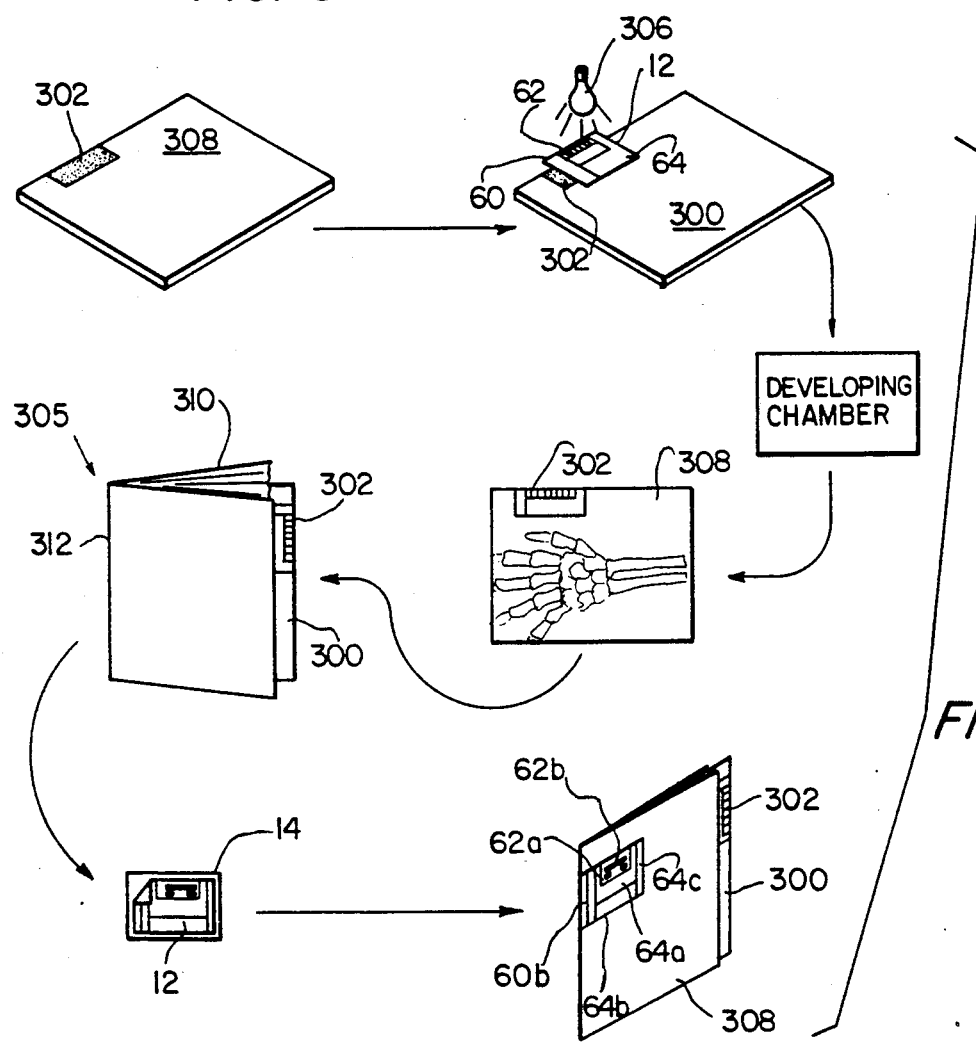
FIG. 5a is a flow diagram showing a first method according to the invention.

Referring now to FIG. 5a, in a preferred method of the invention using an imprinter, a system 10 according to the invention is provided and the required information, for example patient name, date and body part or system to be studied, is filled in. The radiographic film 300 is placed in a conventional frame (not shown) and a lead shield (not shown) is placed over a predetermined radiograph information portion 302 of radiographic film 300 so that the radiograph information portion 302 will remain unexposed during the taking of the radiograph. The lead shield can be provided as part of th frame in which radiographic film 300 is placed while the radiograph is being taken. Alternatively, a lead shield can be put on the receptor (not shown) which holds the frame. Next, a radiograph is taken with conventional equipment, and an image of the body part or system is registered on radiographic film 300 in conventional fashion.

Following the taking of the radiograph label unit 10 is superimposed over radiographic film 300 in a conventional darkroom imprinter, with imprint field 62 of system 10 in registered vertical alignment over radiograph identification portion 302. Label unit 10 is positioned under the positioning clips of an imprinter (not shown). The light source 306 in the imprinter is then turned on for a predetermined time, causing white light to shine through system 10 onto radiographic film 300. Because information material is opaque to white light, a negative image of the information material in imprint field 62 is produced on radiographic film 300 when radiographic film 300 is developed. Thus, the negative image 104 of the bar code appears as an easily readable positive image on the radiographic film 300. The resulting positive image of the bar code on radiographic film 300 can then be read in the conventional fashion. If a sublabel 136 has been used to enter the date in date blank 126, then the negative image 138 of the date also appears as an easily readable positive image on the radiographic film 300.

Figure 5B:
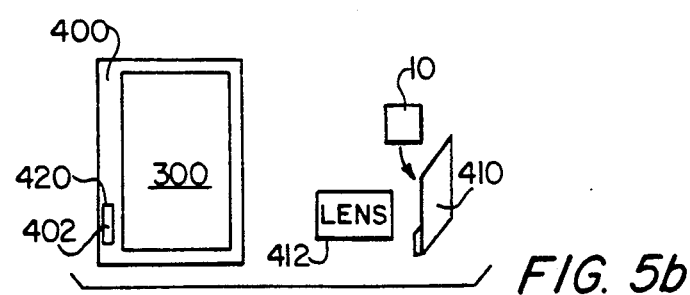
FIG. 5b is a diagrammatic view of one of the steps of a second method according to the invention.
Figure 6A:
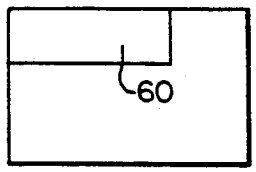
FIGS. 6a through 6f are top plan views of labels according to the invention showing alternative configurations and positions for the information field.
Figure 6B:
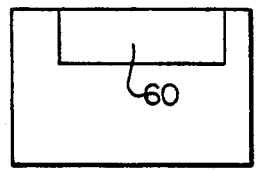
Figure 6C:
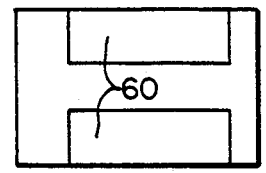
Figure 6D:
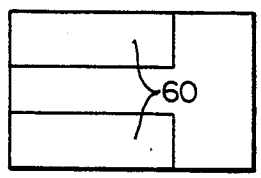
Figure 6E:
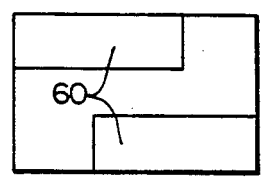
Figure 6F:
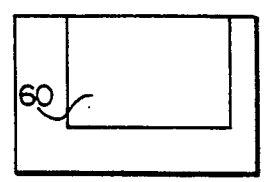

In a preferred method of the invention using an ID camera, the ID camera as shown in FIG. 5b is substituted for the imprinter shown in FIG. 5a. The method is otherwise similar to that described with reference to FIG. 5a. The radiographic film 300 is exposed to X-rays while in a cassette 400 adapted for use with the ID camera and having an area 402 for shielding the imprint area of the radiographic film. As shown in FIG. 5b, the ID camera is provided with a slot 410 for the proper positioning of the label unit 10 in front of the lens 412, the label unit 10 is placed in the slot 410, and the radiographic film 300 in its cassette 400 is placed in the camera. When the cassette 400 hits the back of the ID camera, a pin (not shown) is released, opening a window 420 in the cassette 400 to expose the imprint area of the radiographic film 300, and the image on the imprint field of the label unit 10 is transferred to the imprint area of the radiographic film 300 by the ID camera.

Once the information on label unit 10 has been transferred to radiographic film 300 using the imprinter or ID camera, label unit 10 and radiographic film 300 are removed from the imprinter or camera and radiographic film 300 is developed in conventional fashion (FIG. 5a). As shown in FIG. 5a, label unit 10 can then be used in conjunction with a storage jacket 304 (FIGS. 1d and 1e) for radiographic film 300 for filing of radiographic film 300, in the following manner.

Referring now to FIGS. 1d through 1g, jacket 304 comprises rectangular front and back panels 306 and 308 joined at at least one edge 310a thereof. Preferably, as shown in FIG. 1d, panels 306 and 308 are also joined at edges 310b and 310c. Panels 306 and 308 have opposed interior surfaces 312 and 314 defining a pocket 316 for receiving radiographic film 300 and exterior surfaces 318 and 320 for receiving label 12. Release liner 14 is at least partially removed from label 12 and label 12 is adhered to exterior surfaces 318 and 320 with fold line 136 aligned with edge 310 of jacket 304. A first registration mark 322a is placed at edge 310a, and a second registration mark 322b can be placed at edge 310b, to aid the user in proper placement of label 12. Because fold line 136 is aligned with edge 310 of jacket 304, one of first and second positive images 100 and 102 of the bar code will be placed on exterior surface 318 of front panel 306 and the other will be placed on exterior surface 320 of back panel 308. The bar code can thus be read from either side of jacket 304. Also, if information fields 60 and 60a are color-coded as previously described, then the color-coding can be used to identify jacket 304 after it has been placed in its filing drawer or shelf. For example, the color-coding can represent the year, so that a misfiled jacket will be easily visible.

From the above, it is apparent that many modifications and variations of the present invention are possible in light of the above teachings. It is therefore to be understood that, within the scope of the appended claims, the invention may be practiced otherwise than as specifically described.

What is claimed is:

1. A radiograph identification device for photographically imprinting information onto radiographic film, comprising:
    an adhesive-backed label, said label being made of a photo-transparent material having a photo-transparent adhesive backing, said label being divided into a plurality of information fields comprising at least a machine-readable field and an imprint field, said imprint field being substantially the same size as, and positioned on said label to align with, the light window of a darkroom radiograph imprinter, said information fields including information material which is photo-opaque, said information material in said machine-readable and imprint fields comprising at least an image of a machine-readable marking representing an identification number for the radiographic film; and
    a photo-transparent release liner to which said label is releasably adhered.

2. The device of claim 1, said photo-transparent material being a white paper material.

3. The device of claim 1, said label being made of a transparent polyester film.

4. The device of claim 1, wherein said photo-transparent material permanently accepts ink from a typewriter or printer.

5. The device of claim 1, said image of a machine-readable marking in said machine-readable field comprising at least one positive image of a bar code and said image of a machine-readable marking in said imprint field comprising a negative image of said bar code, said bar code representing an identification number for identifying the radiographic film.

6. The device of claim 5, said machine-readable field comprising two adjacent subfields, said information material in each of said machine-readable subfields comprising a positive image of said bar code.

7. The device of claim 1, said information material in said imprint field comprising a photo-opaque image of at least one word identifying variable information and a photo-opaque box defining a photo-transparent window adjacent said image of said at least one word for entering said variable information therein.

8. The device of claim 1, said information material in said imprint field comprising a photo-opaque background having formed therein a photo-transparent image of at least one word identifying variable information and a photo-transparent window adjacent said image of said at least on word for entering said variable information therein.

9. The device of claim 1, wherein said information material in said imprint field is printed both forwards and backwards, whereby said information material can be read from either the front o back of the radiograph when imprinted on the radiograph.

10. The device of claim 1, said information material in said imprint field comprising an identification number blank for entering said identification number therein.

11. The device of claim 10, wherein said identification number is pre-printed in said identification number blank.

12. The device of claim 1, said information fields further comprising a background field, said information material in said background field comprising a category list for indicating the body part or system to be studied.

13. The device of claim 1, said information fields further comprising a background field, said information material in said background field comprising a list of doctor's names for indicating the name of a doctor.

14. The device of claim 1, said information material in said imprint field further comprising an image of the word "date" and a photo-transparent date blank adjacent thereto for entering the date of the radiograph therein, said device further comprising an adhesive-backed sublabel substantially the same size as said date blank, said sublabel being made of a photo-transparent material having a photo-transparent adhesive backing, said sublabel including thereon an image of a date.

15. A radiograph identification device for photographically imprinting information onto radiographic film, comprising:
    an adhesive label, said label being made of a photo-transparent material and having a photo-transparent adhesive backing, said label having an imprint field substantially the same size as, and positioned on said label to align with, the light window of a darkroom radiograph imprinter, at least a portion of said imprint field having a photo-opaque background, said photo-opaque background having at least one photo-transparent window formed therein for the entry of variable information; and a photo-transparent release liner to which said label is releasably adhered.

16. A radiograph identification device for photographically imprinting information onto radiographic film, comprising:

an adhesive label, said label being made of a photo-opaque material and having an adhesive backing, said label having an imprint field for photographing by a radiograph ID camera, at least a portion of said imprint field having a black background, said black background having at least one blank formed therein for the entry of variable information; and a release liner to which said label is releasably adhered.

17. Radiograph identification and filing apparatus for photographically imprinting information onto radiographic film and filing the radiographic film, comprising:

an adhesive-backed label, said label being made of a photo-transparent material having a photo-transparent adhesive backing, said label being divided into a plurality of information fields comprising at least a machine-readable field and an imprint field, said imprint field being substantially the same size as, and positioned on said label to align with, the light window of a darkroom radiograph imprinter, said information fields including information material which is photo-opaque, said information material in said machine-readable field comprising at least an image of a machine-readable marking representing an identification number for the radiographic film;

a release liner to which said label is releasably adhered, said liner transmitting white light; and jacket means for storing the radiographic film, said jacket means comprising rectangular front and back panels joined at one edge thereof, said panels having interior surfaces defining a pocket for receiving the radiographic film and exterior surfaces for receiving said label.

18. The device of claim 17, said machine-readable field comprising two adjacent subfields, said information material in each of said machine-readable subfields comprising identical machine-readable markings, said subfields being separated from each other by a photo-opaque dividing line defining a fold line, said fold line defining a front portion including one of said machine-readable subfields and a back portion including the other of said machine-readable subfields;

whereby when said label is removed from said release liner, said fold line can be aligned with said joined edges of said front and back panels and said label folded so that said front portion is adhered to said front panel of said jacket means and said back portion is adhered to said back panel of said jacket means, one of said machine-readable markings thereby being visible on each of said panels of said jacket means.

19. Radiograph identification and filing apparatus for photographically imprinting information onto radiographic film using a radiograph ID camera and filing the radiographic film, comprising:

an adhesive label, said label being made of a photo-opaque material and having an adhesive backing, said label being divided into a plurality of information fields comprising at least an imprint field for photographing by a radiograph ID camera and a machine-readable field, at least a portion of said imprint field having a black background, said black background having at least one blank formed therein for the entry of variable information, said machine-readable field having information material therein comprising at least an image of a machine-readable marking representing an identification number for the radiographic film;

a release liner to which said label is releasably adhered, said liner transmitting white light; and jacket means for storing the radiographic film, said jacket means comprising rectangular front and back panels joined at one edge thereof, said panels having interior surfaces defining a pocket for receiving the radiographic film and exterior surfaces for receiving said label.

20. The device of claim 19, said machine-readable field comprising two adjacent subfields, said information material in each of said machine-readable subfields comprising identical machine-readable markings, said subfields being separated from each other by dividing line defining a fold line, said fold line defining a front portion including one of said machine-readable subfields and a back portion including the other of said machine-readable subfields;

whereby when said label is removed from said release liner, said fold line can be aligned with said joined edges of said front and back panels and said label folded so that said front portion is adhered to said front panel of said jacket means and said back portion is adhered to said back panel of said jacket means, one of said machine-readable markings thereby being visible on each of said panels of said jacket means.

21. A method for photographically imprinting information onto radiographic film and labeling a storage jacket for the radiographic film, comprising the steps of:

providing a darkroom radiograph imprinter having a light window and a light source which when turned on, shines through the light window;

providing a label made of a photo-transparent material, the label being divided into at least a machine-readable information field and an imprint information field, the imprint field having substantially the same dimensions as the light window of the imprinter, the information fields including photo-opaque print information material, the information material in the machine-readable and imprint fields comprising at least an image of a machine-readable marking representing an identification number for the radiographic film, and the imprint field further space for the entry of variable information including patient name;

providing jacket means for storing the radiographic film, the jacket means comprising rectangular front and back panels joined at one edge thereof, the panels having interior surfaces defining a pocket for receiving the radiographic film and exterior surfaces for receiving the label;

exposing the radiographic film to X-rays while shielding an information portion of the radiographic film from the X-rays, the information portion having substantially the same dimensions as the imprint field of the label;

placing the radiographic film and the label on the imprinter, the label being interposed between the light window of the imprinter and the information portion of the radiographic film, the light window, the label, and the information portion of the radiographic film being registered in vertical alignment;

transferring the information material from the imprint field of the label onto the radiographic film by exposing the information portion of the radiographic film using the imprinter;

removing the label from the imprinter; and adhering the label to at least one of the exterior surfaces of the jacket means.

22. A method for photographically imprinting information onto radiographic film and labeling a storage jacket for the radiographic film, comprising the steps of:

providing a radiograph ID camera having a lens;

providing a cassette for holding the radiographic film, the cassette having a shield for shielding an imprint area on the radiographic film;

providing a photo-opaque label divided into at least a machine-readable information field and an imprint information field, the imprint field having substantially the same dimensions as the shield of the cassette, the information fields including print information material, the information material in the machine-readable and imprint fields comprising at least an image of a machine-readable marking representing an identification number for the radiographic film;

providing jacket means for storing the radiographic film, the jacket means comprising rectangular front and back panels joined at one edge thereof, the panels having interior surfaces defining a pocket for receiving the radiographic film and exterior surfaces for receiving the label;

placing the radiographic film in the cassette and exposing the radiographic film to X-rays;

placing the cassette with the radiographic film therein in the ID camera;

placing the label in front of the lens of the camera and photographing the label using the camera, to transfer the print information material on the label onto the radiographic film;

removing the label from the imprinter; and adhering the label to the at least one of the exterior surfaces of the jacket means.

* * * * *